(12) United States Patent
Goldenberg et al.

(10) Patent No.: US 6,322,508 B1
(45) Date of Patent: Nov. 27, 2001

(54) AUTOMATED MEAT GRADING METHOD AND APPARATUS

(75) Inventors: Andrew A. Goldenberg; Nenad Kircanski; Ziren Lu, all of Toronto (CA)

(73) Assignee: Engineering Services Inc., Toronto (CA)

( * ) Notice: Subject to any disclaimer, the term of this patent is extended or adjusted under 35 U.S.C. 154(b) by 0 days.

(21) Appl. No.: 09/121,186

(22) Filed: Jul. 23, 1998

(51) Int. Cl.$^7$ ....................................................... A61B 8/00
(52) U.S. Cl. ............................................. 600/443; 73/602
(58) Field of Search ...................... 600/437, 438, 600/442, 443, 449, 459; 73/602, 644

(56) References Cited

U.S. PATENT DOCUMENTS

| | | | |
|---|---|---|---|
| 4,851,984 | * 7/1989 | Doi et al. | 358/111 |
| 5,208,747 | * 5/1993 | Wilson et al. | 600/443 |
| 5,353,796 | * 10/1994 | Schroeder et al. | 73/602 |
| 6,104,827 | * 8/2000 | Benn et al. | 382/110 |

OTHER PUBLICATIONS

Rafid Pahlawan, Surface Following and Detection of the Normal to a Surface–Application to Ultrasonic–Based Pork Carcass Grading, University of Toronto, 1996; pp. ii–139.

Ming Xu, Automated Non–Invasive Pork Grading System–Experimental Study and Signal Processing, University of Toronto, 1996; pp. ii–82, A1–A11, B1–B10, C1–C12.

* cited by examiner

Primary Examiner—Francis J. Jaworski
(74) Attorney, Agent, or Firm—Nancy E. Hill; Hill & Schumacher

(57) ABSTRACT

The present invention relates to an automated grading process and apparatus for grading an animal carcass. The process includes the steps of generating and receiving signals; determining the location of the ribs in the carcass therefrom; determining a predetermined reference point on the carcass; determining a probing location; and probing the carcass. As an example the predetermined reference point may be the first rib and the probe location may be between the third and fourth ribs. The present invention also includes a method for determining the location of the ribs and a method for determining the first rib. The apparatus includes a base, a clamping sub-system for positioning the carcass and a sensing-probing subsystem. The sensing-probing subsystem includes a signal generator and a signal receiver each directed at the clamped carcass; a method of determining the location of the ribs; a method of determining a predetermined reference point on the carcass; a method of determining a probing location; and a probe. The probe is attached to a robotic arm.

47 Claims, 15 Drawing Sheets

1 IS THE ECHO FROM THE BOUNDARY BETWEEN THE WATER COLUMN AND THE SKIN SURFACE
2 IS THE ECHO FROM THE BOUNDARY BETWEEN THE SKIN LAYER AND THE FAT LAYER
3 IS THE ECHO FROM THE CONNECTIVE LAYER IN FAT
4 IS THE ECHO FROM THE BOUNDARY BETWEEN THE FAT LAYER AND THE LEAN LAYER

1 IS THE ECHO FROM THE BOUNDARY BETWEEN THE WATER COLUMN AND THE INTERIOR SURFACE

2 IS THE ECHO FROM THE BOUNDARY BETWEEN THE LEAN LAYER AND THE INTERCOSTAL MUSCLE LAYER

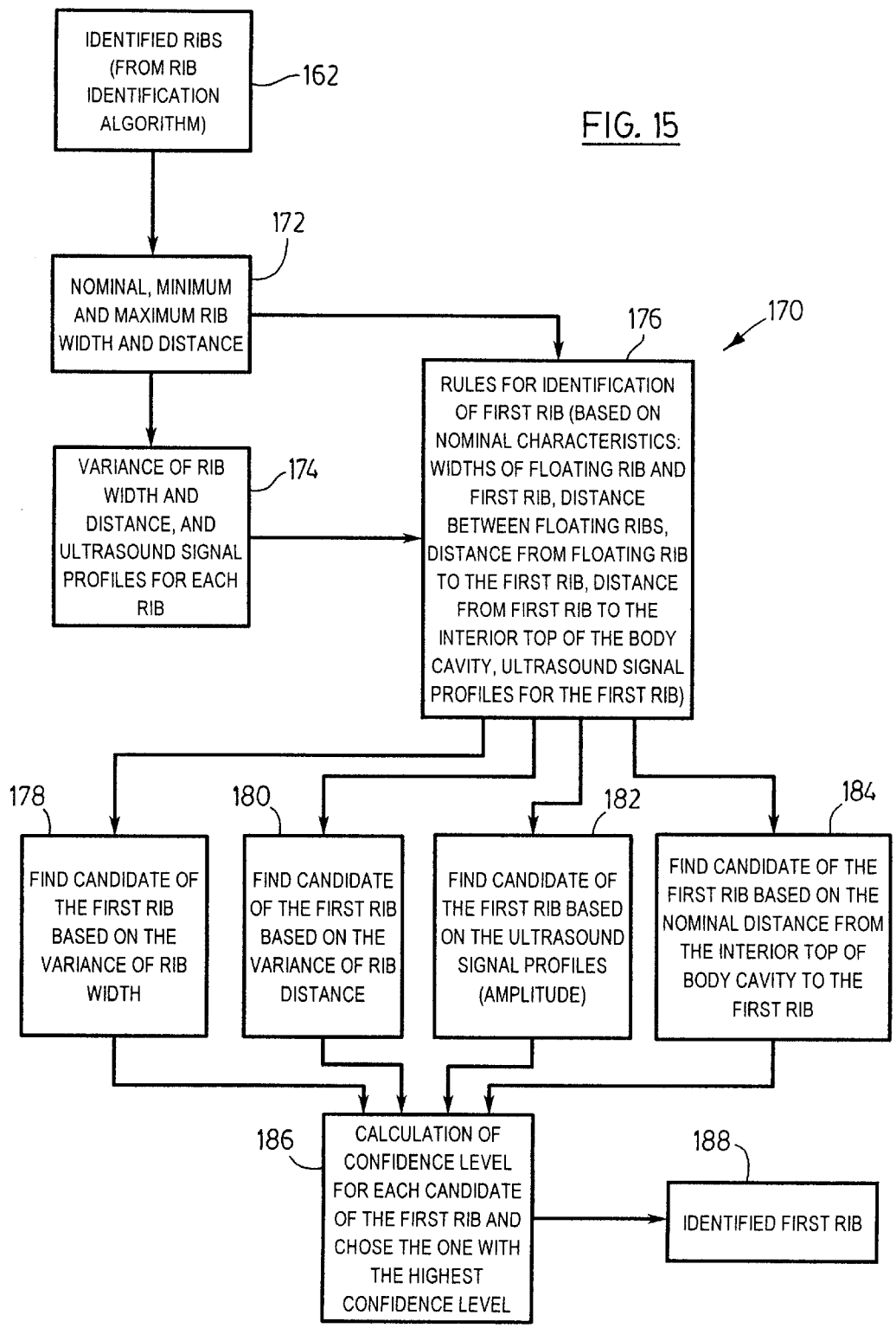

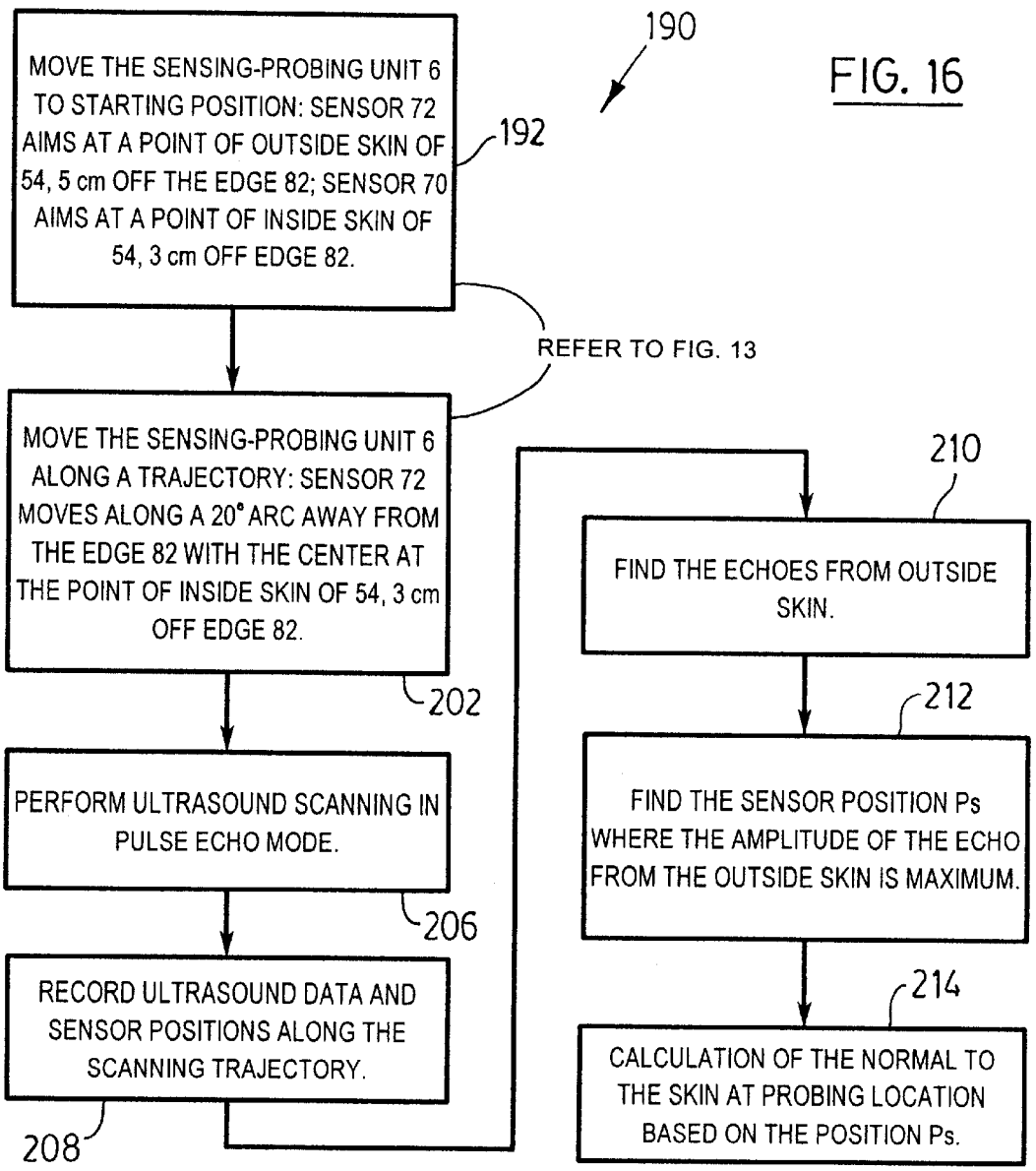

AUTOMATED MEAT GRADING METHOD AND APPARATUS

FIELD OF THE INVENTION

This invention relates to meat grading equipment, and particularly to automated meat grading equipment.

BACKGROUND OF THE INVENTION

Increasingly achieving objectivity of meat grading is one of the main priorities of the meat industry. Accurate grading can help the meat industry determine the price of stock more effectively. This facilitates meat producers in increasing their profit margin and meeting the market's increasing demands for high quality meat. One important element in the grading of carcasses is meat yield, which is estimated using carcass weight and fat and lean depth. Meat yield is directly proportional to carcass weight and inversely proportional to carcass fatness. Another important element is meat quality, such as the marbling score and the paleness, softness, exudativeness of meat (PSE). The exudativeness of meat is the water retaining capacity and soluble protein concentrations in the meat.

Currently, on most production lines the fat/lean depth measurement of pork is performed manually by inserting an electronic infrared probe at a specific predetermined point. This point is set by government regulation for Canada and some other parts of North America for testing pork carcasses and is currently located between the third and fourth ribs 7 cm from the split edge on the back of a suspended carcass. The probe is connected, through a flexible cable, to a computer-based data acquisition system that stores the pertinent information on fat/lean depths. The problems with such a grading method are:

It may cause cross contamination among carcasses through invasive probing.

It is only performed at a single point of the carcass; therefore it provides very limited information for meat yield.

Its accuracy and repeatability are subject to human fallibility, inexperience, and fatigue, etc.

It is costly because one grading station requires two experienced grading operators in each shift since each operator generally only works a twenty minute shift.

Alternatively, a fully automated pork-grading system could be used. Currently the abattoirs in Denmark use a fully automated pork-grading systems. In this system only the depths of fat and lean are measured. They are measured by inserting simultaneously fifteen probes at different symmetric positions on each carcass. There is no analysis of the location of the ribs or other indicators on the carcass. The plurality of probes are merely inserted in each carcass in the same position relative to the system. The advantage of this system is that it provides a plurality of measurements which in turn are used to provide a more accurate estimate of fat and lean yield of a carcass than the single probe location system. However, the deficiencies of this approach are that:

The grading system is extremely costly to manufacture and install because of its large size and complex structure.

As the system uses multiple invasive probes, it increases the chance of cross contamination among carcasses.

Because the system does not detect ribs and bones in the carcass, probes are prone to hitting bones during insertion. This reduces the life cycle of the probes and causes high operation and maintenance costs.

More recently the use of ultrasound techniques for fat/lean (non-invasive) grading has been extensively studied as a promising means to avoid the problems associated with the use of invasive probes. Hand-held ultrasound instruments that produce real-time images on a small monitor have been developed and may be used for pork grading. However, the problems with such instruments are that:

Since the instruments are manually operated, the instrument is subject to some of the same problems as invasive manual grading, for example the accuracy of defining the probe location and repeatability of the test are subject to human fallibility, inexperience, and fatigue, etc.

Such instruments require contact between the ultrasound transducer's surface and the carcass skin surface since the ultrasonic signal does not effectively pass through air. The contact force needs to be properly maintained, that is the pressure on the carcass should be constant so that there are no variations in the depth of the penetration of the probe in the malleable outer layer. This requirement is difficult to satisfy continuously in manual operations.

The instruments that produce real-time images are very expensive.

In addition there has been some work on various components of automated pork grading systems including work that has been conducted in conjunction with the work of the present inventors. Some of this work has been previously published in graduate theses. However, none of these theses show an integrated system. For example, Ming XU, M.A.Sc. Thesis, entitled *Automated Non-Invasive Pork Grading System—Experimental Study and Signal Processing,* published by the Department of Mechanical and Industrial Engineering, University of Toronto, 1996, describes an ultra-sound based non-invasive method of obtaining pork grading measurements, however, it does not disclose the integrated system as a whole and without the other components disclosed herein the system could not be used in a production line similar to those currently found in an abattoir. Further, the method disclosed in this thesis is based on two assumptions, firstly that the ultrasonic sensors are positioned where there is no ribs and that the sensors are positioned correctly relative to the carcass. There is nothing in the thesis which explains how to determine the location of the ribs or how to position the sensors. Each of these requirements is fully disclosed herein.

The Rafid Pahlawan, M.A.Sc. Thesis, entitled *Surface Following and Detection of the Normal to a Surface—Application to Ultrasonic—Based Pork Carcass Grading,* published by the Department of Mechanical and Industrial Engineering, University of Toronto, 1996, describes a method of determining the normal to the skin that is quite different from the present invention. This method while effective would be difficult to meet the speed requirements currently found in an abattoir. Accordingly, heretofore there have been no systems that include all of the components disclosed herein which are necessary to provide a fully automated system using either invasive or non-invasive probing to determine the grade of a carcass.

Accordingly, it would be advantageous to provide an automated meat grading system that would determine the location of the ribs and provide a measurement relative to the quality of the meat at any predetermined location or multiple locations on a carcass. It would be advantageous to provide a meat grading system that could be used in a continuous scanning process. It would be advantageous to provide a meat grading system that can invasively probe meat with a predetermined speed of entry and exit. Further, it would be advantageous to provide an automated meat grading system that is modular. Preferably the automated meat grading system would reduce the likelihood of cross contamination and be more reliable.

SUMMARY OF THE INVENTION

In this invention, an automated meat grading system is presented. The system performs the entire grading process automatically by: (i) holding the carcass fixed with respect a reference co-ordinate or frame; (ii) finding a probing location(s); (iii) performing grading; and (iv) releasing the carcass. The automated meat grading system is able to carry different probes to perform various grading operations, invasively or non-invasively, such as, fat/lean depth measurement or meat quality measurements. The automated meat grading system is able to preform probing at one discrete location or multiple locations or it can perform a continuous scan. To eliminate the problems associated with contact-type ultrasound sensors, a water-squirting technique is used. The squirting technique allows for the transmission of the ultrasound wave via a water column, so that contact between the ultrasound sensor and the pork skin is not required.

The features of this invention are:

The automated meat grading system has a modular robotic structure. It can meet various grading requirements by using different probes to carry out different grading operations.

The control system of the automated meat grading system is designed based on multi-processor, multi-tasking concept to achieve high speed with regard to real-time control and data processing.

The system software associated with the present invention is designed based on the hybrid environment concept. This concept results in efficient and reliable computer architecture using inexpensive off-the-shelf software and hardware components.

The ribs and bones are detected by using ultrasound sensors in through-transmission mode.

The fat and lean depths are measured by using ultrasound sensors in dual-echo mode.

Ultrasound signal processing software to detect ribs, and measure fat and lean depths is designed by using rule-based expert system technology.

The external shape of carcass is detected to locate the probing position and orient the probe by using multiple distance sensors and data fusing technology.

The softness of the meat (one of meat quality measurements) may be measured from measurements of probing force and calculations using impedance control technology.

A sensor for measuring the marbling score may be carried by the automated meat grading system wherein the marbling score of meat is estimated by using dual-echo mode based on the detection of ultrasound speed through the meat.

In one aspect of the invention there is provided an automated grading process for grading an animal carcass having a plurality of ribs comprising the steps of:

a) generating and receiving signals directed at the carcass to obtain data wherein the signals are chosen from the group of ultrasonic and laser sensors;

b) determining the location of the ribs in the carcass from the data to determine the identified ribs;

c) determining a predetermined reference point on the carcass;

d) determining a probing location with reference to the predetermined reference point and the identified ribs; and e) probing the carcass and obtaining a grading measurement at the probing location.

In another aspect of the invention there is provided a method running on a computer of determining the location of ribs in a scanned carcass from ultrasonic data scanned therefrom comprising the steps of:

a) defining rules for identification of the ribs based on anatomical parameters of known carcass ribs including at least an ultrasonic signal profile of a rib;

b) comparing the ultrasonic data with the rules; and c) determining portions of the ultrasonic data that correspond with at least one rib to determine at least one identified rib.

In a further aspect of the invention there is provided a method of determining the normal to the skin of a carcass comprising the steps of:

a) generating and receiving ultrasonic signals with an ultrasonic sensor directed at the carcass to obtain ultrasonic skin data in relation to the position of the sensor;

b) moving the ultrasonic sensor and changing the direction of the signal in relation to the carcass; and c) determining the position of the sensor when it is normal to the skin.

In yet another aspect of the invention there is provided an automated meat grading apparatus for grading an animal carcass. The apparatus includes a base, a clamping subsystem for positioning the carcass and a sensing-probing subsystem. The sensing-probing subsystem includes a signal generator and a signal receiver each directed at the clamped carcass; a method of determining the location of the ribs; a method of determining a predetermined reference point on the carcass; a method of determining a probing location; and a probe. Preferably the probe is attached to a robotic arm.

Further features of the invention will be described or will become apparent in the course of the following detailed description.

BRIEF DESCRIPTION OF THE DRAWINGS

The invention will now be described by way of example only, with reference to the accompanying drawings, in which:

FIG. 15 is a flow chart of a first rib identification method; and

FIG. 16 is a flow chart of a method for finding normal at a probing point.

DETAILED DESCRIPTION OF THE INVENTION

In an abattoir each carcass is suspended from a gambrel that hooks the rear legs. The gambrel slides on an overhead conveyor. The conveyor moves the gambrels and thus the carcasses along the conveyor line, at a speed of about 5.3 inches/sec. The distance between two carcasses is about 24 inches. Before arriving at the grading station, the carcass has been cut into two halves from the tail to the neck along the mid-line, and internal organs have been removed. When the gambrel is sliding on the conveyor, the carcass may swing and rotate around the contact point of the gambrel with the conveyor.

Apparatus

Figure 1:
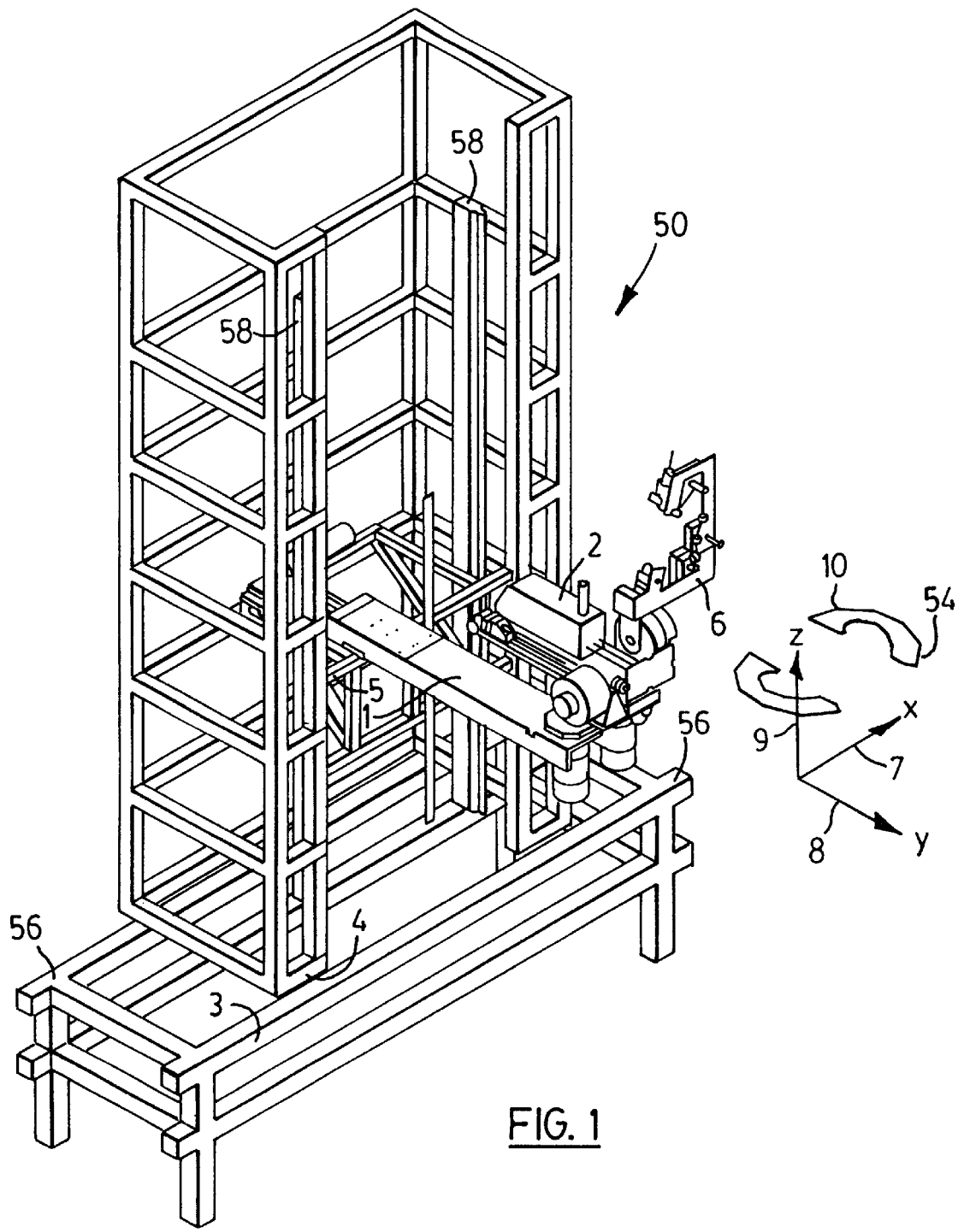
FIG. 1 is a perspective view of the sensing-probing subsystem.
Figure 5:
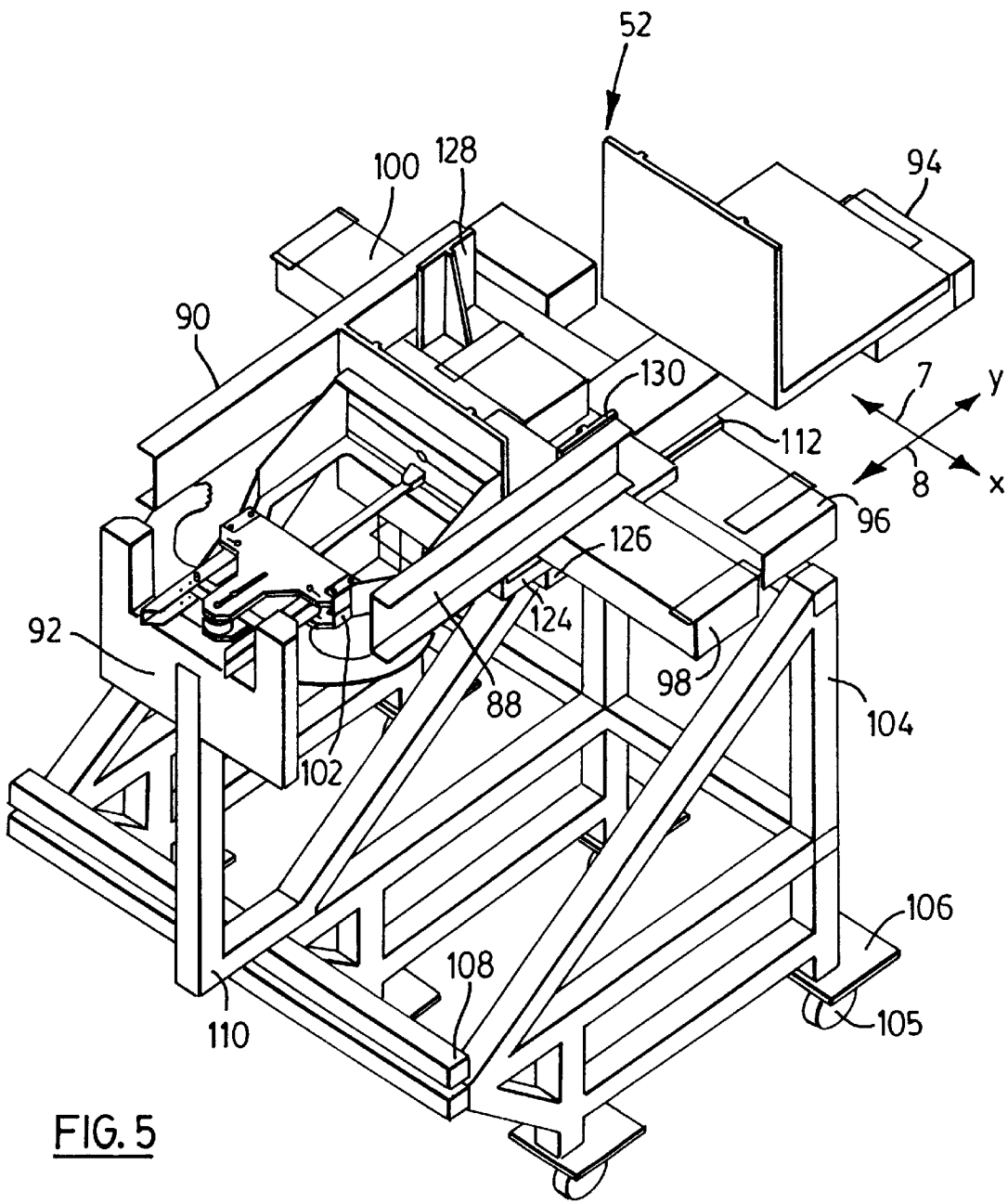
FIG. 5 is a perspective view of the clamping subsystem.

The automated meat grading system of the present invention consists of two subsystems: sensing-probing subsystem 50 shown in FIG. 1 and carcass clamping subsystem 52 shown in FIG. 5. The Automated meat grading system should be installed along the conveyor line in x direction 7 with the sensing-probing subsystem 50 (as shown in FIG. 1) facing the backside 10 of carcass 54 (the top view as shown in outline) and the clamping subsystem facing the other side. The function of the sensing-probing subsystem 50 is to find probing position and perform fat/lean depth measurement, while the function of the clamping subsystem 52 is to hold the carcass 54 stationary with respect to the sensing-probing subsystem 50 during the grading operation.

Referring to FIG. 1, the sensing-probing subsystem 50 consists of five major parts: a horizontal base 3, a vertical tower 4, a robot arm 1, an invasive probing unit 2 and a sensing probing (non-invasive) unit 6. The function of the base 3 and vertical tower 4 is to carry the robot arm 1 so that it can follow the motion of the carcass 54 along the conveyor and move vertically along the backside 10 of the carcass 54.

The vertical tower 4 is supported on four linear bearings that are mounted on two parallel and horizontal rails 56 of the base 3. Vertical tower 4 is capable of 60 cm long linear motion. The end-effector carrier 5 (facing carcass 54) is supported by another four bearings that are mounted on two parallel and vertical rails 58 on the tower 4. The end-effector carrier 5 is capable of 160 cm long linear motion.

The tower 4 and the end-effector carrier 5 are each driven by timing belts (not shown), which are made from reinforced rubber and can constantly be exposed to water. The total weight of the carrier and its payload is balanced. The total weight of the end-effector carrier 5 with its payload is balanced by a counter weight mounted on the back of the tower. This increases the stability of the system, and eliminates the need of a brake to stop the motion when the system is powered down. A timing belt, mounted on four timing pulleys forming a rectangle, drives the end-effector carrier 5 and its counter weight. The counter weight is supported on four Teflon bushings that slide on two stainless steel bars. This type of design provides an efficient and reliable drive that can be exposed to constant splashes of water and does not require accurate installation. The base 3 and tower 4 are fabricated from stainless steel—a stringent requirement of the food industry.

Two actuators drive the tower 4 and end-effector carrier 5 along the x-direction 7 and the y-direction 8 respectively. Each actuator consists of a stepper motor with a reduction gear, a coupling and a timing pulley. The timing pulley is mounted on a shaft using a heat shrink technique in order to eliminate the use of a key and to ensure proper concentricity of the pulley around the shaft. The gear output shaft is joined by a bellow coupling to the pulley shaft. The motor, gear and the coupling are located in a sealed housing. All gaps in the housing are filled with silicon adhesive, and shaft seals are used. Water is thus prevented from entering the housing. The end-effector carrier 5 carries a robot arm 1 and enables horizontal and vertical motions in a vertical plane that is tangential to the back of a suspended carcass 54. The robot arm 1 carries an invasive probing unit 2 and a sensing probing unit 6.

Figure 2:
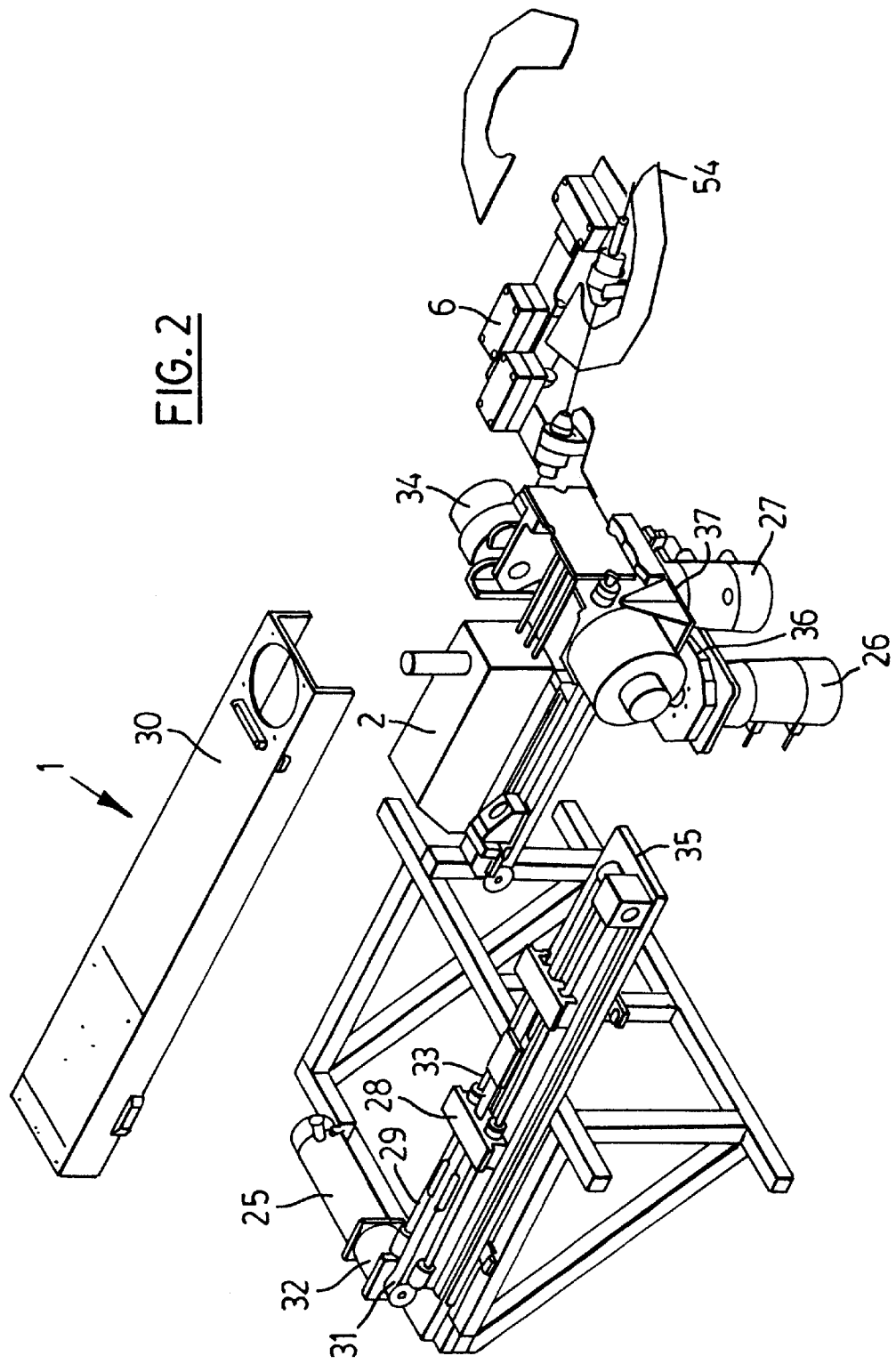
FIG. 2 is an exploded view of the robot arm.

FIG. 2 illustrates the structure of the robot arm 1. Robot arm 1 of the Automated meat grading system is developed as a generic testing bed for different pork grading tasks such as fat/lean depth and PSE measurements. Robot arm 1 is able to carry simultaneously two different probes: non-invasive and invasive ones. Robot arm 1 has three degrees of freedom. In the configuration of the system shown herein the robot arm 1 is able to carry the sensing-probing unit 6 and the invasive probing unit 2 in the horizontal plane allowing access to the carcass 54 from various angles. The configuration of the system herein allows access to a region R shown in FIG. 7 at 55, which is between 0 and 12 cm from the split edge, in a range of not less than ±30° from the normal. For invasive probing both sensing-probing unit 6 and invasive probing unit 2 are carried by robot arm 1. For non-invasive probing only the sensing-probing unit 6 need be carried.

The first joint is prismatic and consists of a DC (direct current) servomotor 25, a 16:1 gearbox 32, a ⅜" Pitch timing belt 29 with 144 teeth, two pulleys 31 and an aluminum 76 cm long U channel link 30. The motor 25 drives the U channel link 30 through the timing belt 29 to four bearings 28 on two parallel and horizontal rails 33. The U channel link is capable of 32 cm long linear motion. The horizontal rails 33 are mounted on the base plate 35. Base plate 35 is mounted on the end-effector carrier 5 shown in FIG. 1.

The second and third joints are rotary ones. Two compact actuators 26 and 27, each includes a DC motor and a 100:1 gear ratio harmonic driver are used in these two joints to achieve very small backlash. This is required for an accurate control of the orientation of the probe to ensure the accuracy of interior probing location. The second joint, which is driven by actuator 26, is mounted on the end of link 30. The second joint carries a 15-cm long link 36 and can rotate about 240°.

The third joint, which is driven by the actuator 27 is mounted on the end of link 36 and can rotate about 330°. The third joint carries the base plate 37 on which the sensing-probing unit 6 and invasive probing unit 2 are mounted. Base plate 37 holds a two-position 90° FESTO pneumatic rotary actuator 34 that can hold the sensing-probing unit 6 in either horizontal or vertical direction.

All three motors used in the first, second and third joints include shaft-mounted encoders for position measurements.

Each joint has two micro switches to control the homing and end of travel positions of the joint. Due to the environment the system has to operate in, all components of the arm are sealed and easily accessed for cleaning. Stainless steal is used wherever needed in the arm according to the food industry standards.

Figure 3:
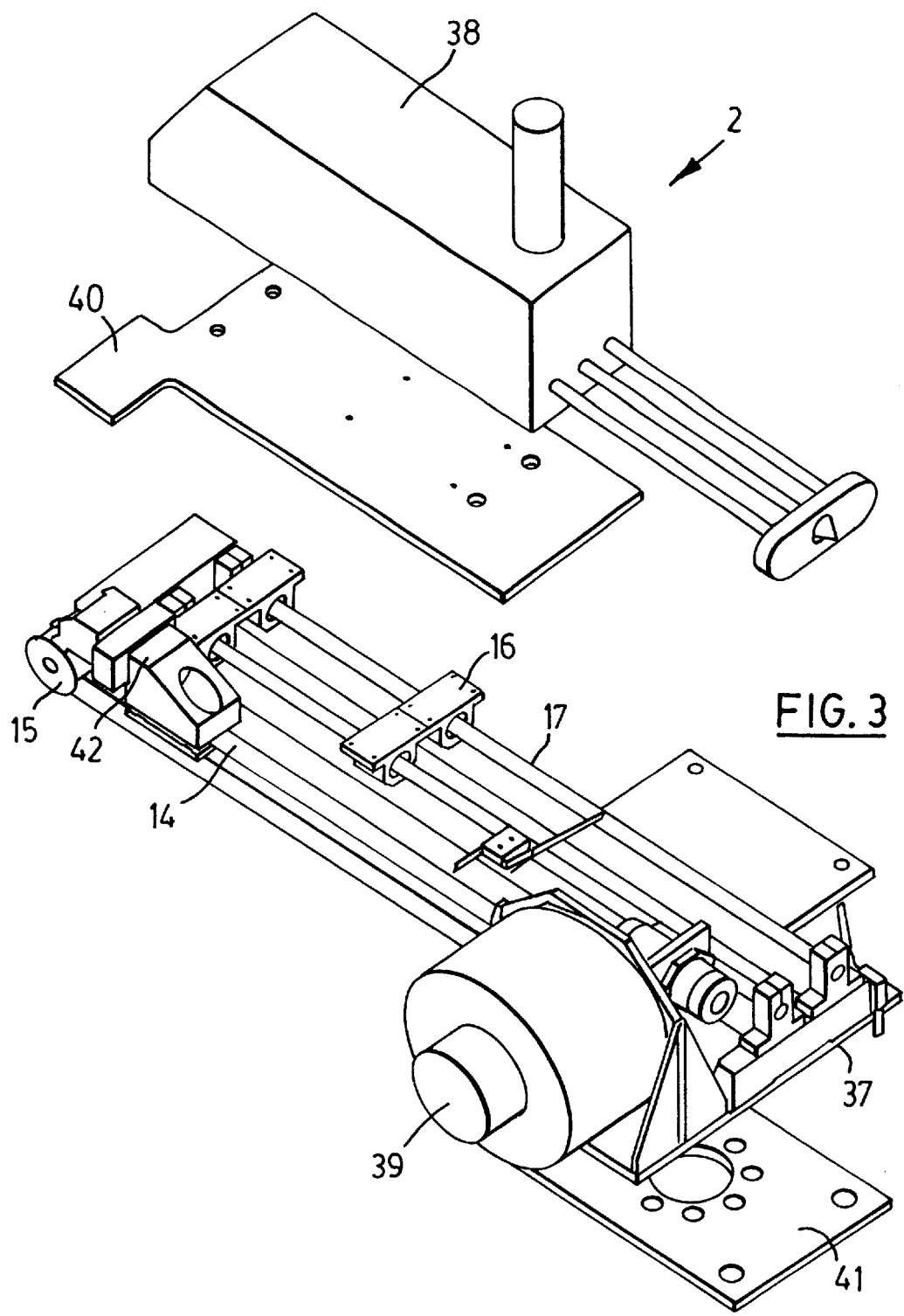
FIG. 3 is an exploded view of the invasive probing unit.

FIG. 3 illustrates the structure of the invasive probing carrier and unit which is shown generally at 2. The function of the invasive probing carrier and unit 2 is to carry an invasive probe 38 and perform insertion and retraction of the probe from the probing site. The invasive probing carrier and unit 2 has one prismatic joint that consists of an actuator 39 including a DC servomotor and a 15.1:1 gearbox, a ⅜" Pitch timing belt 14, two pulleys 15 and an aluminum probe mounting plate 40. The motor 39 drives the plate 40 through the timing belt 14 and force sensor 42 to four bearings 16 on two parallel and horizontal rails 17 capable of 25 cm long linear motion. The rails 17 are mounted on the base plate 37, which is connected through an interface plate 41 to the third joint of the robotic arm 1 of FIG. 2. The force sensor 42 can withstand a maximum force of about 300 lb. The measurement resolution for force sensor 42 is about 0.5 lb. The maximum probing force during an insertion is about 9 lb. A force threshold is set at 12 lb. Whenever the probing force is larger than the threshold, that indicates the probe 38 is probably hitting a rib, the invasive probing carrier and unit 2 will immediately retract the probe 38 from the carcass 54. This is found to be very effective to protect the probe 38. The invasive probing carrier and unit 2 can be arranged so that the speed of insertion and retraction is a constant. The constant speed provides a more accurate measure from the invasive probe and is clearly an improvement over what can be consistently achieved by a manual operator.

Figure 4:
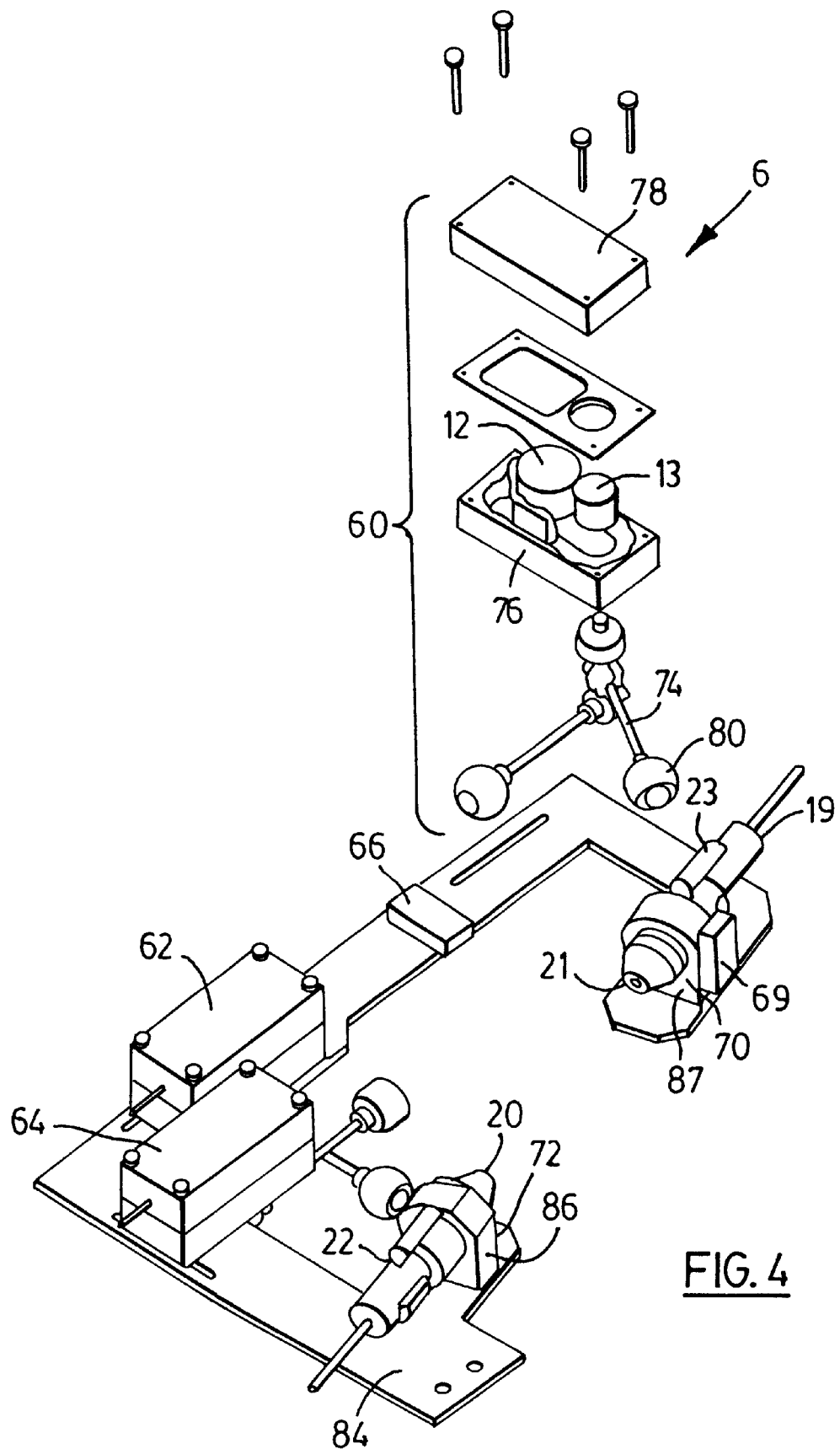
FIG. 4 is an exploded view of the sensing-probing unit.

FIG. 4 illustrates the structure of the sensing-probing unit 6. The functions of the sensing-probing unit 6 are to perceive the physical shape of a carcass 54, detect rib positions, find required probing locations and perform fat/lean ratio measurement non-invasively. To do this the sensing-probing unit 6 is designed to have various sensors such as infrared, electromechanical and ultrasonic or laser sensors.

Figure 7:
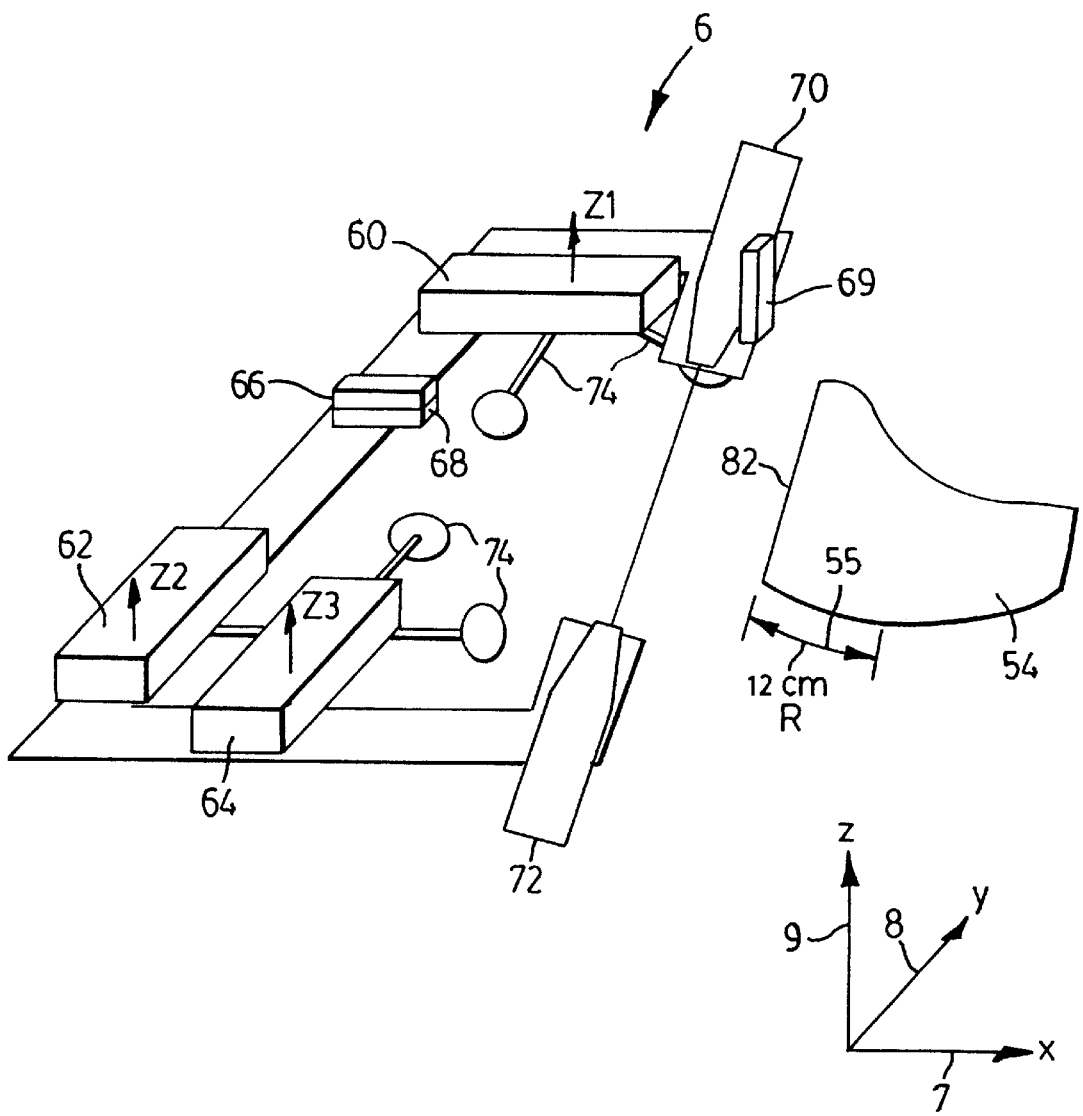
FIG. 7 is a schematic view of the sensing-probing unit.

A schematic representation of sensing-probing unit is shown in FIG. 7. The sensing-probing unit 6 includes distance sensors, infrared sensors, and ultrasound sensors. The distance sensors 60, 62 and 64 measure the skin and cutting surfaces of a carcass 54. The infrared sensors 66, 68 and 69 detect positions of split edges. The ultrasound sensors 70 and 72 are used to measure rib positions as well as the depth of fat/lean.

Referring to FIG. 4, each distance sensor 60, 62, 64 consists of a small DC motor 12 and a precision rotary transducer (potentiometer) 13 that drives one or two arms 74 through a precision rotary transducer (potentiometer). The motor 12 and the potentiometer 13 are mounted in box portions 76 and 78. The box portions 76 and 78 are sealed so that they are waterproof. Each arm 74 has a roller 80 on its end. To measure a surface position, the motor drives the arm towards the surface of the carcass 54 so that the roller 80 of the arm 74 keeps contact with the surface. The contact point between the roller 80 and the surface of the carcass 54 can be determined by measuring the angle of the arm 74 through the potentiometer 13.

The infrared sensors 66, 68 are used to detect the presence of an object. Referring to FIG. 7, when the robotic arm carries the sensing-probing unit 6 along the y direction 8 infrared sensors 66 and 68 will detect the presence of an object. Infrared sensor 69 attached to ultrasound sensor 70 detects the presence of an object along the z direction 9.

Specifically infrared sensor 69 detects the interior top of the carcass 54 body cavity when the robotic arm carries the sensing-probing unit 6 upward in the z direction 9 to perform ultrasound scanning. As soon as the top is detected, the robotic arm stops and the rib identification method, described below, begins. The method is used to find the positions of the first four ribs from the data collected during the scanning. Then the sensing-probing unit 6 moves downward to the position between the third and fourth ribs to find the probing location.

It will be appreciated by those skilled in the art that the apparatus described above could be readily adapted to produce multiple probe locations or a different probe location. The above description shows how the apparatus forming the present invention has been adapted for the presently prescribed probe location for pork carcasses for Canada, that is between the third and fourth rib 7 cm from the split edge on the back of a suspended carcass.

Further, this information together with the measurement by the distance sensor 60 or 64 which detects the position of the cutting surface in the x direction 7 is used to guide the robot arm and position of the sensing-probing unit 6 at a proper location with respect to the split surface 82. In some cases, it may be required to clear the sensing-probing unit out of the way for invasive probing operations. The pneumatic two-position actuator 34 of the robot arm in FIG. 2 does this.

Referring to FIG. 4, two ultrasonic sensors 70, 72 using squirter technique which transmits and receives ultrasound via a water-jet, are used to detect rib positions for the purpose of locating the probing site and measure fat/lean depth. Each sensor is mounted in a water-jet nozzle 20 (21). The nozzle is designed to provide a stable water jet for transmitting and receiving ultrasound. Room temperature water enters each sensor nozzle through two pipes 22 (23), and exits at the end of the nozzle 20(21). The resulting water jet flows directly towards the carcass 54 skin in the scan region. A valve on the water supply can adjust the water jet speed, so that stable, laminar flow is obtained. This reduces the noise and dissipation of the ultrasound energy through the water jet. The ultrasound sensors 70, 72 are arranged so that they aim at each other. Ultrasound sensors 70 and 72 are mounted on the base plate 84 through two brackets 86 (87). The distance between the sensors is 15 cm.

Figure 8:
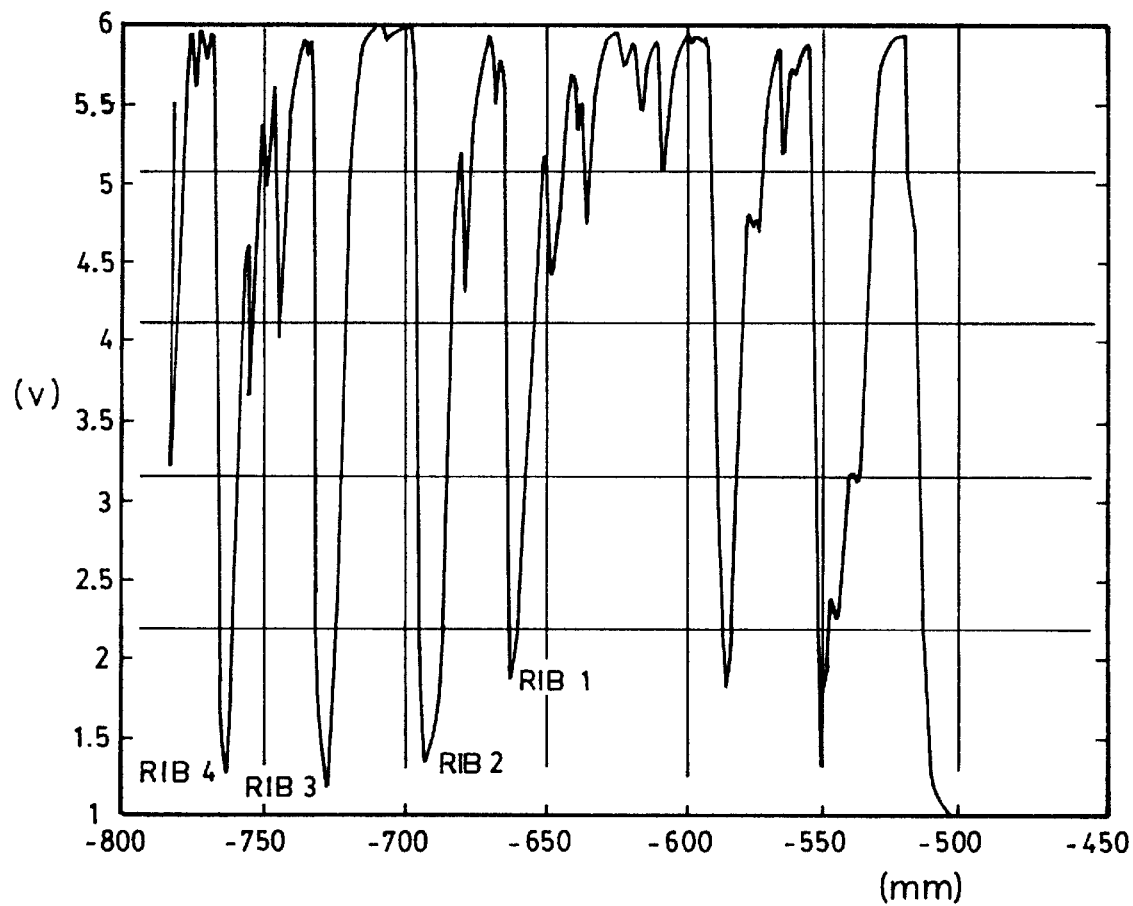
FIG. 8 is a typical ultrasound signal profile showing rib positions.

The principles to detect ribs and measure fat/lean depth are as follows. Referring to FIG. 7, to detect ribs, the ultrasound sensors work in through-transmission mode: sensor 70 is a transmitter, sensor 72 is a receiver. If there is a rib in the path of the centerline of the sensors, the receiver signal gets very small or there is no signal received from the transmitter. Alternatively, if there is no rib in the path of the center line, the receiver will receive a very large signal. FIG. 8 shows a typical signal profile from the receiver during a longitudinal ultrasound scan at the back of a carcass 54. The clear concave shapes show the positions of ribs 1, 2, 3, 4. The ultrasound signal for rib detection is sampled and saved in a data file.

FIG. 5 shows the structure of the clamping subsystem 52. The function of the clamping subsystem 52 is to firmly hold the carcass 54 so that it will be stationary with respect to the sensing-probing subsystem 50. Specifically, the clamping subsystem 52 should be able to restrain the motion of the carcass 54 so that its peripheral motion (swinging and rotating) is negligible, and the body is held in a desired position and orientation with respect to the sensing-probing subsystem 50 during the grading process.

Figure 12:
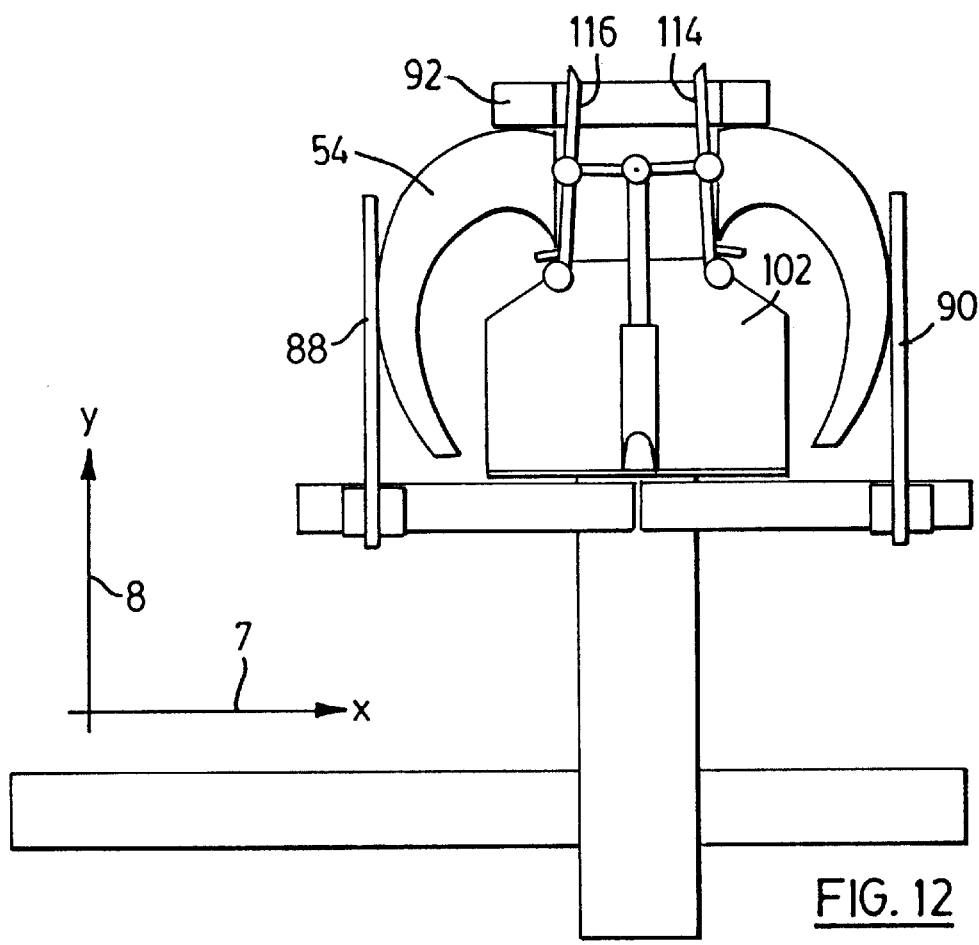
FIG. 12 is a schematic view of the clamping subsystem holding a carcass.

The major parts of the clamping subsystem 52 are two side jaws 88, 90, one center jaw 102 and one reference plate 92. FIG. 12 shows the configuration of the clamping subsystem holding a carcass 54. The side jaws 88, 90 restrain the motion of the carcass 54 along the y-axis 8. The function of the center jaw 102 is to push the carcass 54 against the reference plate 92 and orient the carcass 54 so that it will be in alignment with the center jaw. Therefore, when the carcass 54 is clamped, its position and orientation are fixed.

Figure 6A:
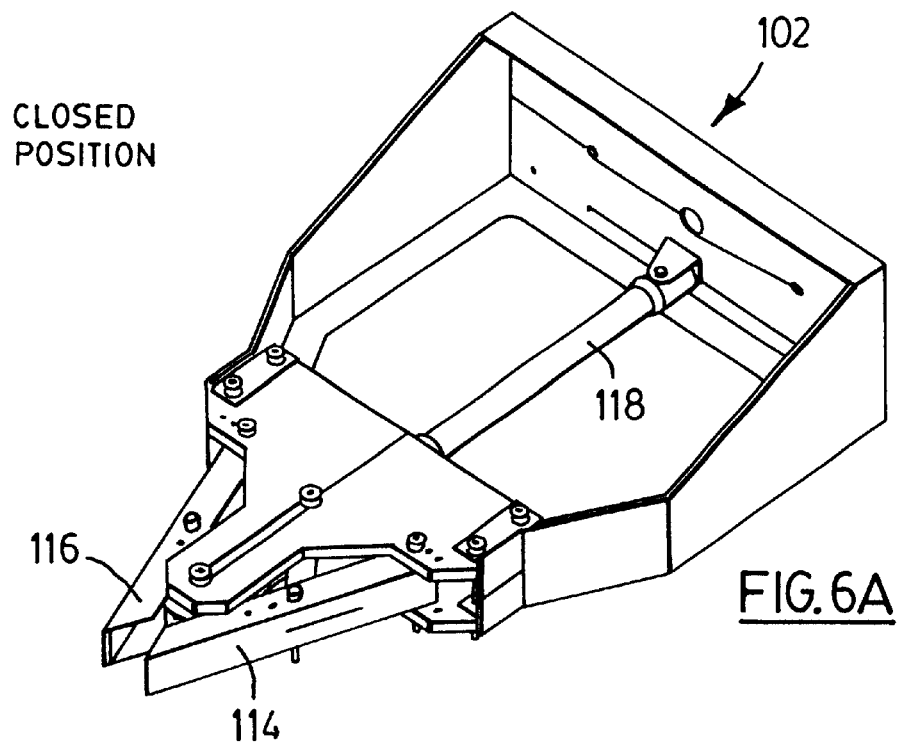
FIG. 6A is a perspective view of the center jaw of the clamping subsystem shown in FIG. 5 shown in the closed position.
Figure 6B:
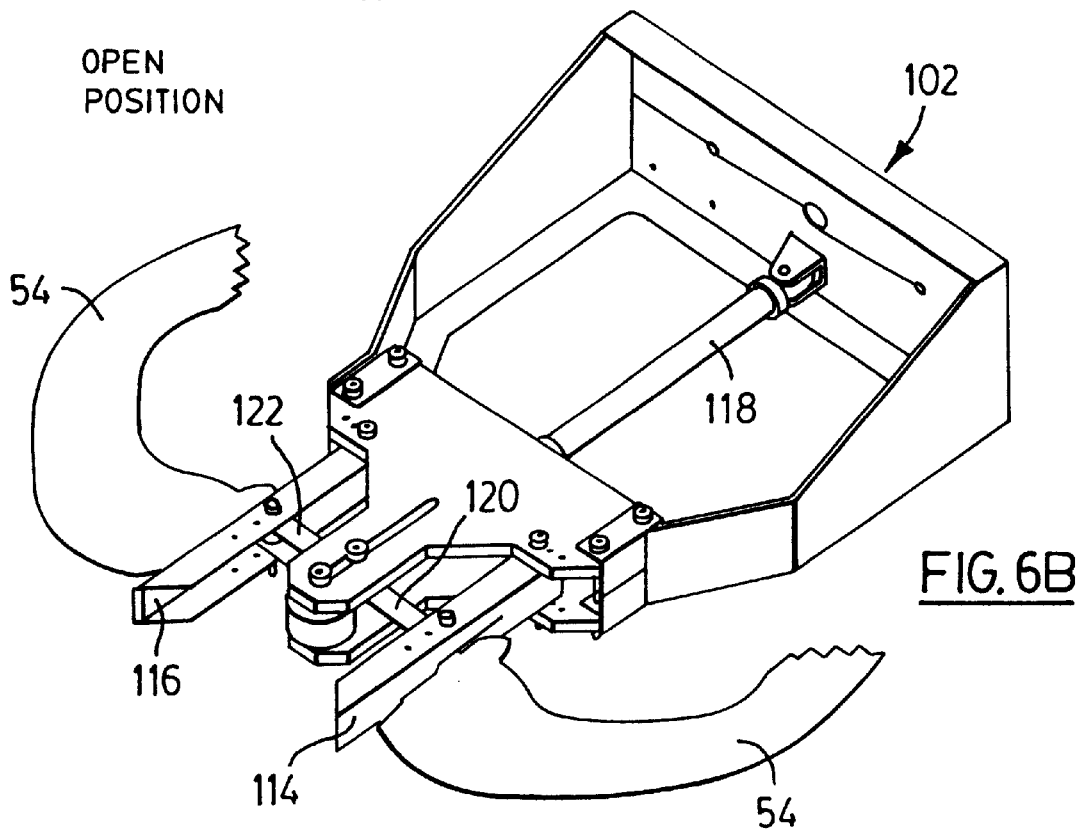
FIG. 6B is a perspective view of the center jaw of the clamping subsystem shown in FIG. 5 shown in the open position.

Referring to FIG. 5, the clamping subsystem has four linear actuators 94, 96, 98 and 100. Actuator 96 provides the motion along the conveyor line (x-axis 7) for the side jaws 88, 90, center jaw 102 and reference plate 92. Actuator 94 provides the motion along y-axis 8 for the center jaw 102 and two side jaws 88, 90. Actuators 98, 100 move the side jaws 88, 90 to clamp a carcass 54 as shown in FIGS. 6A and 6B. Each linear actuator consists of a DC servomotor and ball screw. The DC servomotors are chosen for this application because of its ease to implement force/torque control mode that is required for the clamping operation.

The base frame 104 supports all other components of the system. The frame is made from stainless steel square tubes. Six mounting plates 106 enable the user to anchor the frame 104 to the floor, and level it. Each mounting plate has a roller 105, which allows for mobility of the system. The base frame 104 provides direct support to the actuator 96 and the reference plate 92. The front square tube 108 of the frame 104 is used as a rail to support a roller unit that carries the beam 110 on which the reference plate 92 is mounted. The reference plate 92 restrains the position of the carcass 54 when the center jaw 102 pushes it. Support beam 110 carries the reference plate 92. The support beam 110 is connected to the connection plate 112 of actuator 94. The connection plate 112 connects the actuator 94 to the actuator 96.

The reference plate 92 is made of stainless steel as required by the food industry. The support beam 110 is made of stainless steel square tube; the rollers 105 are made of high-density polyethylene. The connection plate 112 between actuators 94 and 96 is made of anodized high-strength aluminum. The support beam 110 pivots around the connection plate 112 between the actuators 94 and 96. This enables the user to compensate for inaccuracy in the base frame 104, the roller position and motion relative to the motion of actuator 96. The center jaw 102 pushes the carcass 54 against the reference plate 92 and expands the opening on the backside of the carcass 54.

Referring to FIGS. 6A and 6B, the center jaw 102 has two front plates 114, 116 that can be either in close or open position. The motion of the front plates 114, 116 is provided by the pneumatic actuator 118 through a four-link mechanism that consists of links 120, 122 and front plates 114, 116. When the center jaw 102 moves toward the carcass 54, the front plates are in closed position. This enables the front plates easily to go into the opening on the backside of the carcass 54, and then to expand the opening when the front plates are pushed by the pneumatic actuator 118. Referring to FIG. 5, center jaw 102 is carried by a combination of two plates 124, 126 that are connected between the actuators 94, 98, and 100. This structure enables the user to secure the actuators 94, 98, 100 separately and tie the assembly together.

Special connecting screws are used to secure the above parts together. All connecting plates 112, 124, 126 are made from anodized high-strength aluminum. The high-strength aluminum side jaws 88, 90 are shaped in a channel structure, to maintain strength and low weight. Each side jaw 90, 88 is carried by a custom made bracket 128, 130 that is attached to the actuator 100, 98 respectively.

process

The process of the present invention will now be discussed. The discussion will be specifically with regard to a pork grading system. However, based on the process disclosed herein the system could be adapted to be used in other meat grading applications.

The process herein is described in relation to a probe location between the third and fourth ribs, 7 cm from the split edge on the back of a suspended carcass, prescribed probe location for pork carcasses for Canada and some parts of North America. It will be appreciated by those skilled in the art that any location could be chosen as the probe location or alternatively multiple probe locations could be chosen.

Determining Rib Location

Software to automatically find the rib positions from the data file has been developed and is used. The software has a rule-base that is constructed based on anatomical parameters of ribs such as width, distance between two adjacent ribs etc. The software first locates all concave shapes from the data from the ultrasound sensors 70, 72 in through-transmission mode as discussed above with reference to FIG. 8. Since not all the concave shapes represent ribs, the rule-base is used to determine rib positions from these concave shapes. This is described in more detail below with reference to the flow charts found in FIGS. 14, 15 and 16. Alternatively, a single sensor can be used in pulse-echo mode. However, preferably the through transmission mode is used.

Figure 14:
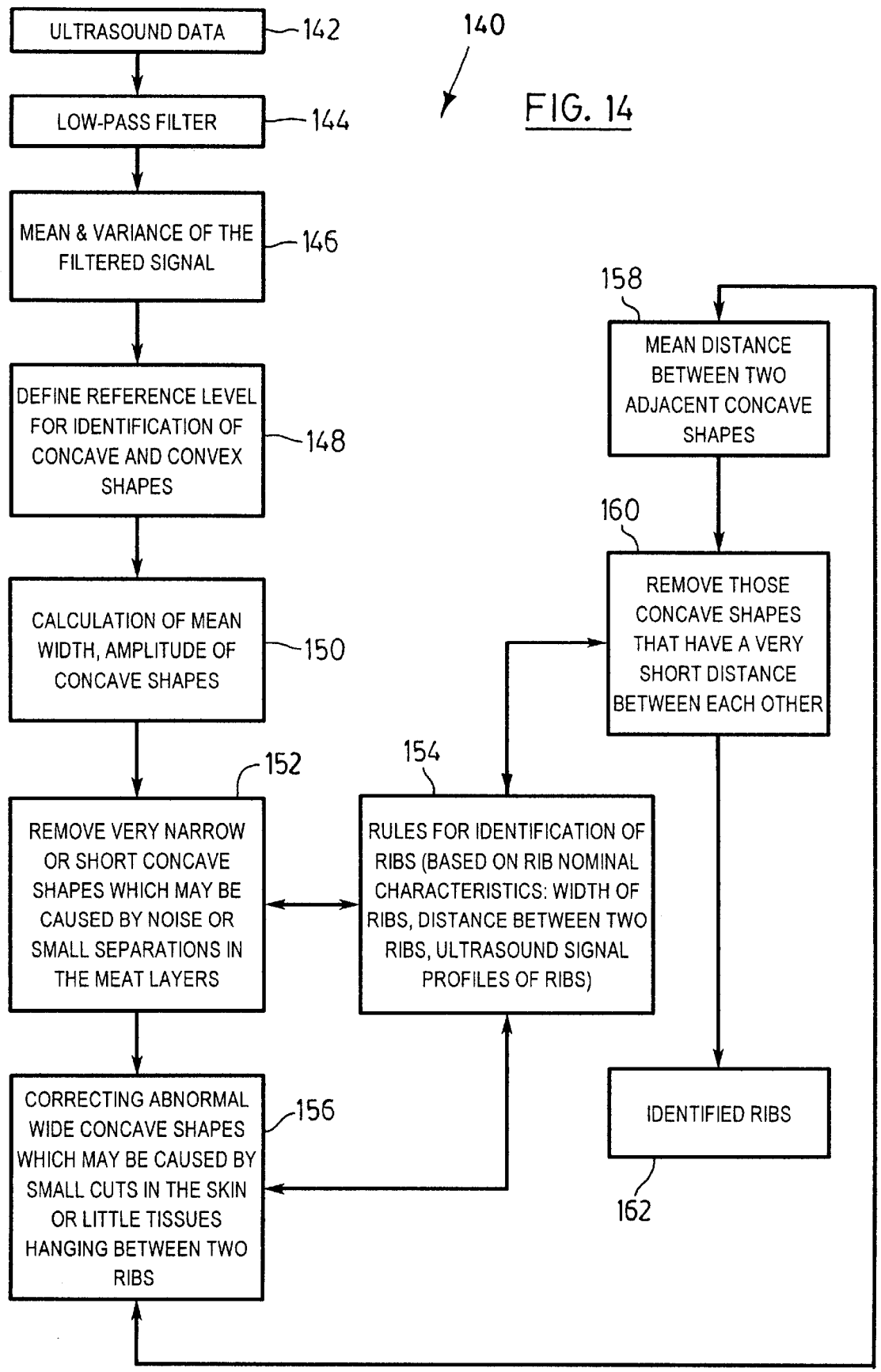
FIG. 14 is a flow chart of a rib identification method.

Referring to FIGS. 14, 15 and 16 from the ultrasound data the location of the ribs are identified and specifically the location of the first rib is identified. Generally the carcass is hung with the tail end up and the first rib is the one at the bottom of the carcass or the rib closest to the neck. Thereafter the sensing position is identified.

The method for identifying the location of the ribs is shown generally at 140 in FIG. 14. Specifically the data 142 from the ultrasound sensors is passed through a low-pass filter 144 to produce a filtered signal. The low-pass filter 144 removes high frequency components such as noise from the power supply and motor servo system, in the raw signals or data 142 from the ultrasound sensors. Preferably the low-pass filter is a first order Butterworth™ type filter with a cut-off frequency of 5 Hz. The mean and variance of the filtered signal is determined 146. Reference levels for identification of concave and convex shapes are defined 148. The reference levels are the average of the filtered data 144. The mean width and amplitude of the concave shapes is determined 150.

The rules for identification of ribs are defined through comparison with existing data regarding a carcass. These rules are important so that concave shapes which do not indicate rib positions are removed. The concave shapes which are not indicative of rib positions are usually caused by small separations in the meat layers. To identify and remove the false concave shapes that do not correspond to ribs, empirical data of the nominal values or rib width, distance between adjacent ribs, and amplitude of concave shapes are used. The rules define ranges of acceptable predetermined values 154 which are based on general characteristics of width of ribs, distance between two ribs and ultrasound signal profiles of ribs.

To define the mean width, the concave shapes that are narrower than 17 mm and wider than 4.8 mm are determined and the mean width is determined. The width of the concave shape is corrected by removing those concave shapes that are narrower than 0.5 times the mean width or wider than 1.6 times the mean width. The amplitude of the concave shape is corrected by removing those concave shapes whose minimum values are higher than the minimum value of the filtered data as determined above plus 0.8 or 0.6 times the reference level for the concave shape as defined above. The distance is corrected by removing the concave shapes with the distance to the adjacent concave shape that is less than 21 mm. These values have been developed empirically from the observation of the ultrasound scanning data, rib shapes and their positions. It will be appreciated by those skilled in the are that these values will need to be modified as the system is adapted to be used for grading other types of meat. However, from the disclosure herein it is clear how these anomalous shapes can be removed no matter what type of carcass is being graded.

Anomalous shapes are removed 152 through a comparison with the rules. The mean width and amplitude of the concave shapes are compared to a range of acceptable predetermined values 154. Abnormally wide concave shapes may be detected which are caused by small cuts in the skin or by tissue hanging between two ribs. Accordingly abnormally wide concave shapes are corrected 156 through a comparison with acceptable predetermined values 154 to determine the corrected concave shapes.

The mean distance between adjacent corrected concave shapes is determined 158. The mean distances are compared with acceptable predetermined values 154 and concave shapes that are too close together are removed 160 providing the identified ribs 162.

Determining a Probe Location

In order to have a system of grading meat that is consistent, objective and repeatable, the probe location or locations needs to be predetermined with respect to a point on the carcass. Currently in Canada and some parts of North America the probe location for pork carcasses is between the third and fourth ribs, 7 cm from the split edge on the back of a suspended carcass. However, it will be appreciated by those skilled in the art that measurement could also be taken at other locations.

Currently the probe site, when probing is conducted manually is between the third and fourth rib and therefore once the first rib is identified the third and fourth rib can also be identified. Accordingly, it is important to identify the first rib so that the correct probe site can then be determined. There are often "floating ribs" located above the first rib. These "floating ribs" are small bones that have not fully developed into ribs. These small bones are usually flatter and wider than the normal ribs. In addition, typically the distance between the first rib and the adjacent "floating rib" is different from the distance between ribs. Further the amplitude of the ultrasonic signal for concave shapes corresponding to the "floating ribs" are likely higher than those of normal ribs. Accordingly, these differences or variances in the rib width, distance between ribs and amplitude of ultrasonic signal are examined to determine the first rib and eliminate the "floating rib".

Referring to FIG. 15, the method of determining the first rib is shown generally at 170. The identified ribs 162 are considered and the nominal, minimum and maximum rib width and the distance to the above next adjacent identified rib is determined for each rib 172. The variance of rib width and distance and ultrasound signal profiles for each rib is determined 174. The nominal, minimum and maximum rib width and distance to the above next adjacent identified rib and the variance of rib width and distance to the above next adjacent identified rib and ultrasound signal profiles is compared to rules 176 for identification of first rib (based on nominal characteristics) for widths of floating rib and first rib, distance between floating ribs, distance from floating rib to the first rib to the interior top of the body cavity and ultrasound signal profiles for the first rib. A candidate for the first rib based on the variance of rib width is determined 178. A candidate for the first rib based on the variance of rib distance to the above next adjacent identified rib is determined 180. A candidate for the first rib based on the ultrasound signal profiles (amplitude) is determined 182. A candidate for the first rib based on the nominal distance from the interior top of body cavity to the first rib is determined 184. Calculation of confidence levels for each first rib candidate is determined 186 and the candidate with the highest confidence level is identified as the first rib 188.

Rules 176 have been developed empirically. There are generally three rules which have been developed. The first rule for determining the first rib is: where the distance to the above next adjacent identified rib is greater than 1.4 times the mean distance between all identified ribs OR the distance to the above next adjacent identified rib is greater than 43 mm AND the width is greater than 0.8 times the mean width OR the width is greater than 5 mm AND the amplitude of the ultrasonic signal is less than 1.5 times the mean amplitude of the ultrasonic signals for identified ribs OR the amplitude of the ultrasonic signal is less than 1.9 THEN it may be a first rib. The second rule is: where the change in width of two adjacent concave shapes is greater than 0.5 times the mean width AND the amplitude of the ultrasonic signal is less than the minimum amplitude of the ultrasonic signal for the identified ribs plus 0.5 OR the distance to the above next adjacent identified rib is greater than 30 mm THEN it may be a first rib. The third rule is: where the changes in distances between thee consecutive concave shapes are greater than 0.5 times the mean distance between identified ribs AND the amplitude of the ultrasonic signal is less than the minimum amplitude of the ultrasonic signal for the identified ribs plus 0.5 OR the width is between 0.75 mm and 1.35 times the mean width for the identified ribs THEN it may be a first rib.

Determining the Position and Orientation of Probe

For certain types of measurements it is advantageous to be able to position the probe so that it is normal to the skin. The normal to the skin can be approximately determined by first varying the orientation of the probe in pulse echo mode and then determining where the amplitude of the echo is maximal. At this point the orientation of the probe will approximate normal.

As discussed above, the probe location set by government regulation for Canada and some other parts of North America for testing pork carcasses is currently located between the third and fourth ribs, 7 cm from the split edge on the back of a suspended carcass. The probe location is further described as the probe being inserted along a line between the above point and 3 cm from the split edge on the front of a suspended carcass. The probe is to be inserted approximately normal to the skin. The tolerance for the insertion point is plus or minus 2 cm.

Figure 13:
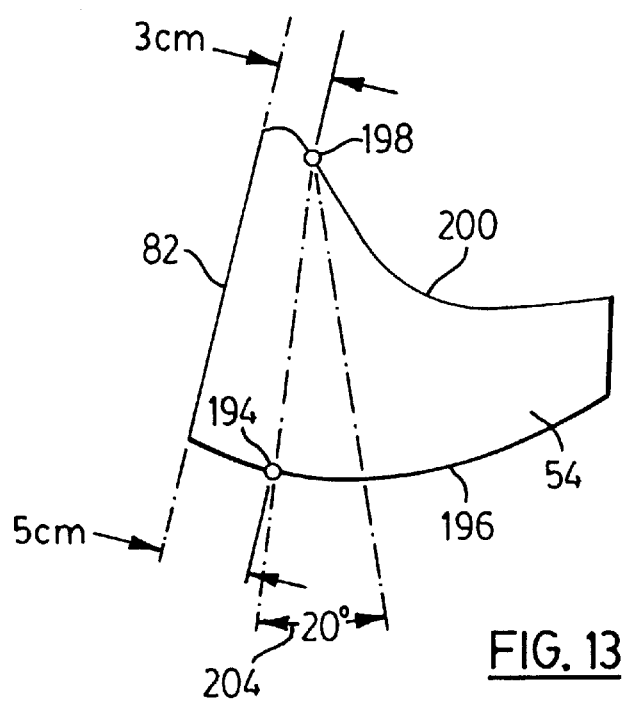
FIG. 13 is a sectional view of a carcass similar to FIG. 9 but showing an ultrasound scanning trajectory for use with a meat depth measurement.

The method of determining the position and orientation of the probe at the sensing point is shown generally at 190 in FIG. 16. The sensing probe unit 6 is moved to a starting position 192. In the starting position, ultrasound sensor 72 is aimed at a point 194 which is 5 cm from the edge or spit surface 82 on the outside 196 of carcass 54 (shown in FIG. 13). In the starting position, ultrasound sensor 72 is oriented such that it is also aimed at point 198 which is 3 cm from the edge or split surface 82 on the inside 200 of carcass 54. The sensing probe unit 6 is moved along a trajectory 202 (FIG. 16). Specifically ultrasound sensor 72 moves along a 20° arc 204 away from edge or split surface 82 with a center point at 198 (FIG. 13). Therefore as sensor 72 is moved along trajectory 202 it is also aimed at point 198.

Referring to FIG. 16, a scan in pulse echo mode along the trajectory 202 is performed 206. The ultrasound data and sensor position along the scanning trajectory is recorded 208. The echoes from the outside skin are determined 210. The sensor position Ps is determined where the echo from the outside skin is maximum 212. The normal to the skin at Ps is determined 214. The output from the ultrasound instruments is the amplitude of the echo. Therefore if there is no echo the output is zero. On the other hand if there is an echo, the output will be between 0 and 5 volts depending on the echo amplitude. When the ultrasound beam is normal to the skin surface the amplitude of the echo is maximal. Therefore the orientation of the sensor shows the normal to the skin when the signal reaches its maximum during the scanning procedure.

It will be noted by those skilled in the art that in the above method the apex of the trajectory was fixed at point 198. The assumption was made by the inventors that the apex of the trajectory should remain fixed because on the front of a meat carcass between the third and fourth ribs there is a greater variation in matter over a short distance and they would get a better reading. However, those skilled in the art will appreciate that the position on the back of the carcass could be fixed and the position of the front could be varied. Further, for probe locations between different ribs and for different types of meat the assumptions will be varied but the probe can be positioned and oriented using the above method.

Fat/Lean Depth Measurement

Once the probe location or location is determined a fat/lean depth measurement is made. The probe can either be a invasive probe or a non-invasive probe, or both. The invasive probe could be any conventional probe currently used in the meat grading industry. The non-invasive probe described below could be used.

Figure 9:
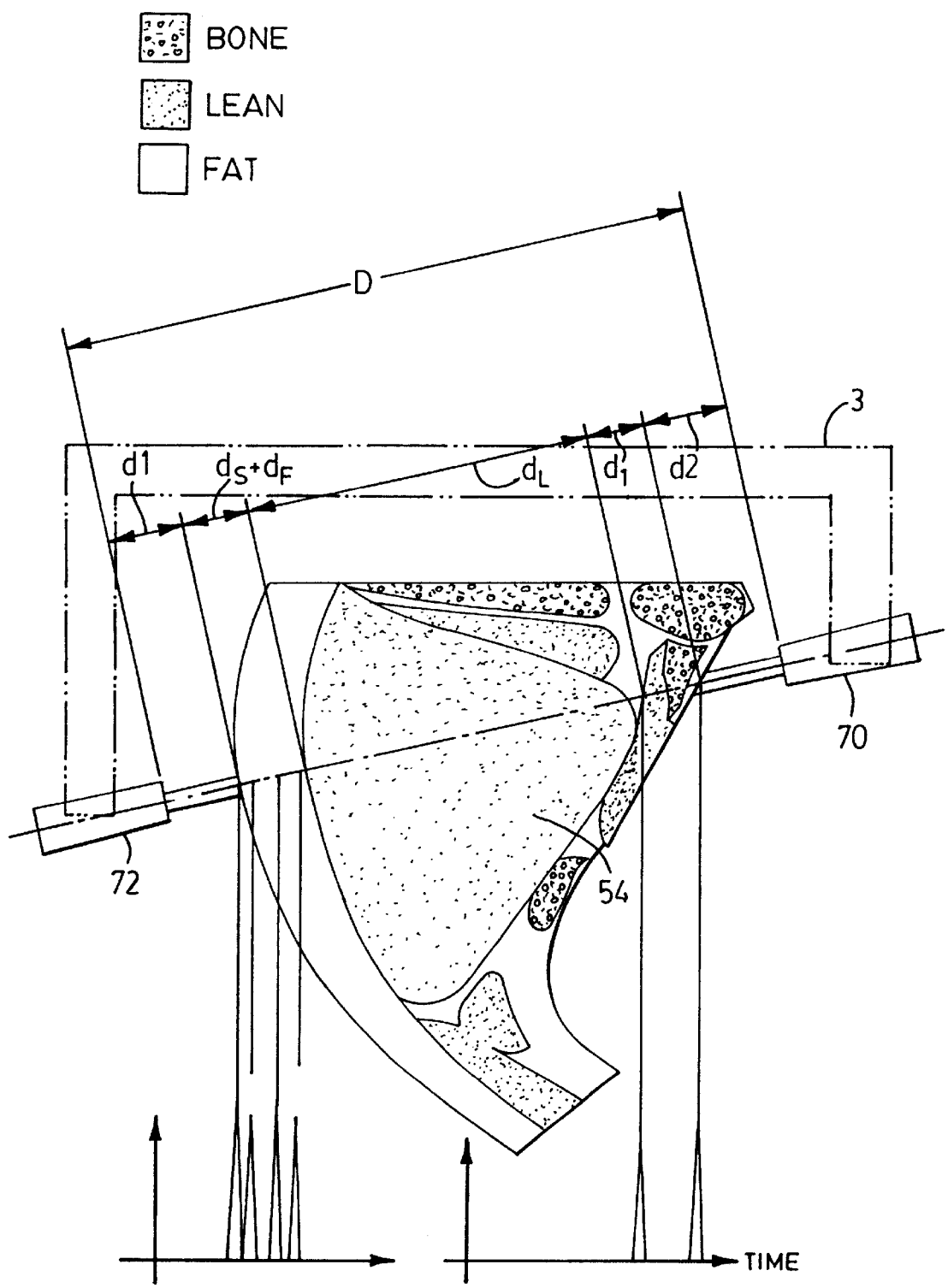
FIG. 9 is a sectional view of a carcass showing the principle of fat and lean depths measurement by using two ultrasound sensors.

Referring to FIGS. 7 and 9, the non-invasive measurement of fat/lean depth uses ultrasound sensors 70 and 72 in pulse-echo mode. Accordingly the non-invasive probe of the present invention is the ultrasound sensors 70 and 72 in conjunction with the analysis of the data collected therefrom. Ultrasound sensors 70 and 72 are positioned at the probing site on either side of a pig carcass 54 as described above. Each transducer works in pulse-echo mode to detect echoes from boundaries between adjacent tissue layers. The exterior transducer or sensor 72 measures skin depth (dS) and fat depth (dF), as well as the distance between the transducer and the carcass skin surface (d1). The interior transducer measures the distance between the interior transducer or sensor 70 and the interior surface of the pig carcass 54 (d2), and the depth of the intercostal muscle layer (d1). Since the exact distance between the two sensors (D) is known, the depth of lean (dL) can be calculated by the following equation:

$$dL = D - d1 - dS - dF - d1 - d2$$

Where d1—distance from exterior sensor 72 to skin,
dS—depth of skin,
dF—depth of fat,
dL—depth of lean,
d1—depth of intercostal muscle,
d2—distance from interior sensor 70 to interior surface,
D—distance between sensors 70 and 72

Figure 10:
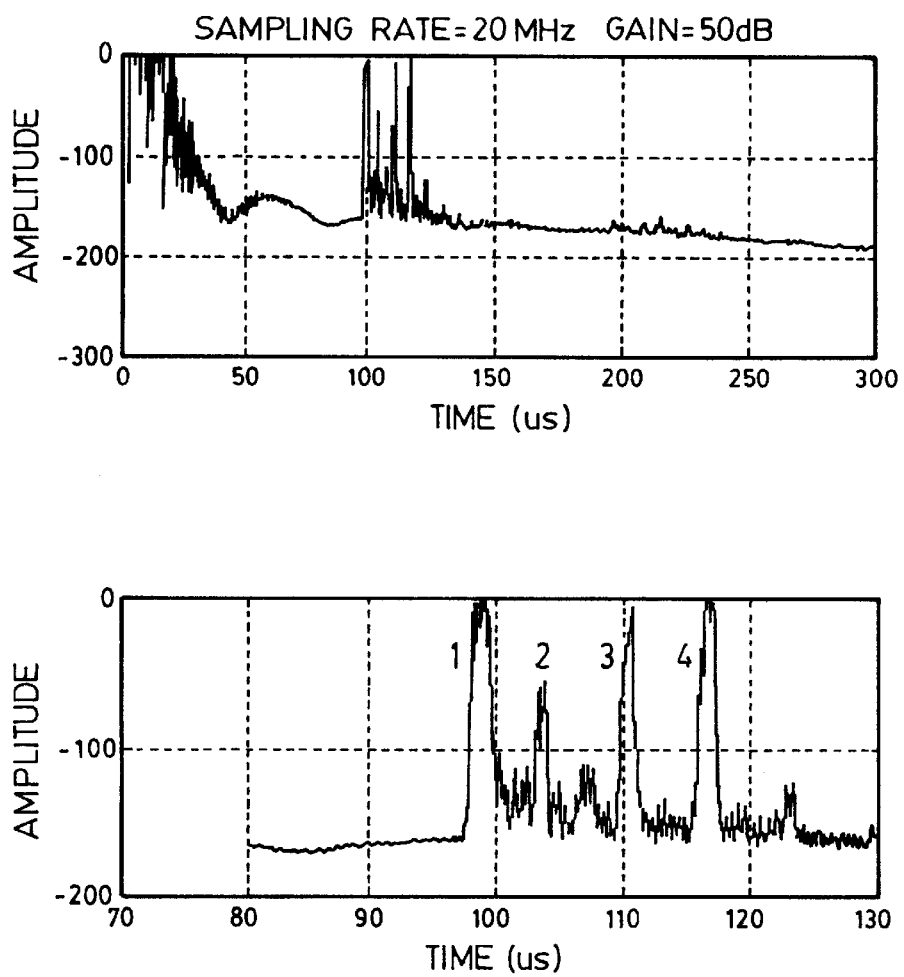
FIG. 10 is a typical signal from ultrasound sensor used as a receiver.
Figure 11:
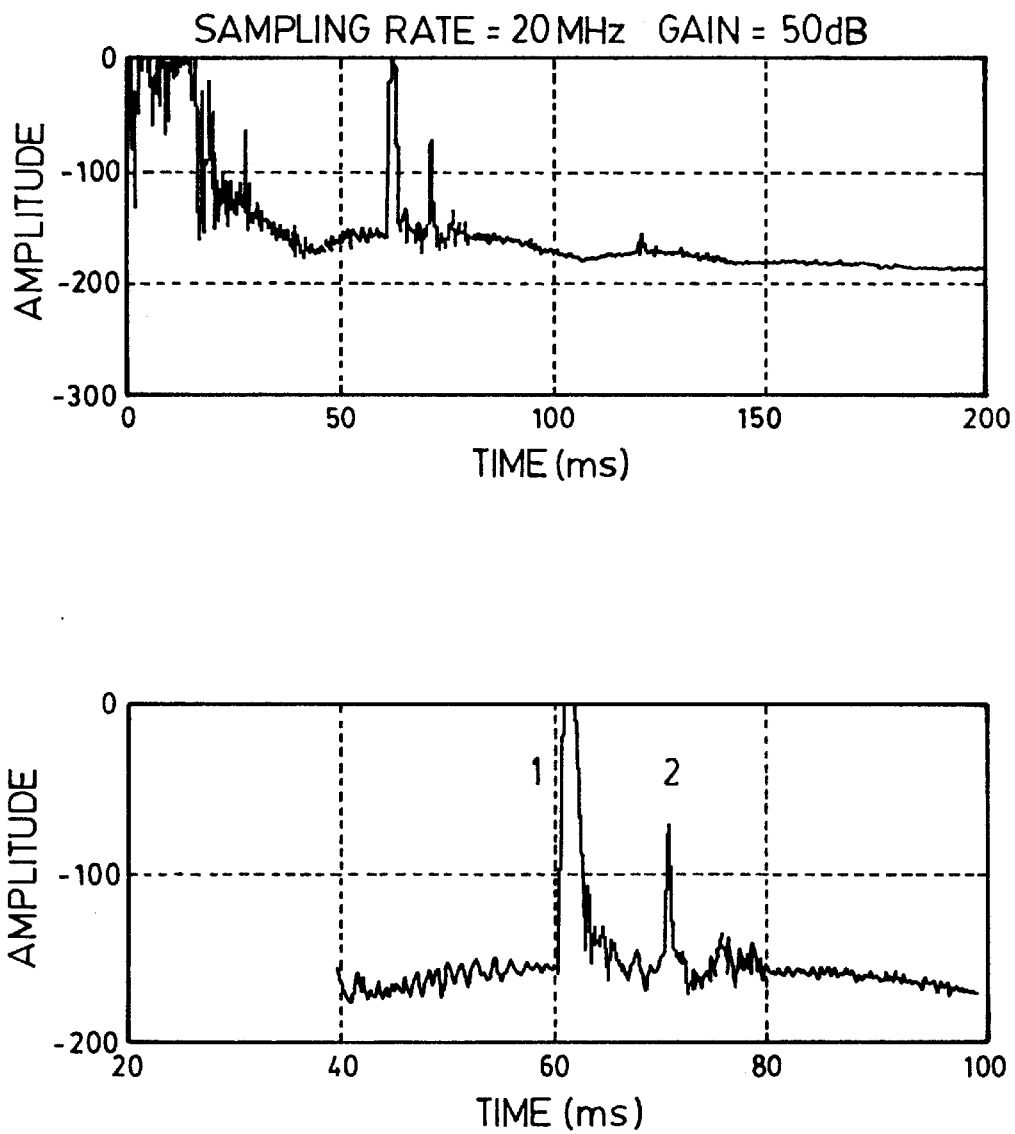
FIG. 11 is a typical signal from ultrasound sensor used as a transmitter.

FIG. 10 and FIG. 11 show the typical ultrasound echoes from the ultrasound sensors 70 and 72 respectively. An ultrasound signal processing algorithm has been developed to identify the echoes from the sampled ultrasound signals and calculate the depths of fat and lean. These are fully explained in the Ming XU, M.A.Sc. Thesis, entitled *Automated Non-Invasive Pork Grading System—Experimental Study and Signal Processing,* published by the Department of Mechanical and Industrial Engineering, University of Toronto, 1996.

The above method can be adapted to vary the location of the probe or added a number of other locations. For example the plurality of probe locations could be identified at locations other than the rib locations. From the data at these multiple probe locations a map of the fat and lean characteristics between the rib locations this would be considered a continuous scanning process by those skilled in the art.

It will be appreciated by those skilled in the art that the apparatus and method of the present invention provides an automated meat grading system that can determine the location of the ribs and provide a measurement relative to the quality of the meat at any predetermined location or multiple locations on a carcass. The present invention provides a meat grading system that can be used in a continuous scanning process. Further the present invention provides a meat grading system that can invasively probe meat at predetermined speed of entry and exit.

It will be appreciated by those skilled in the art that laser sensors could be used as an alternative to ultrasonic sensors, however this would increase the overall cost of the apparatus.

It will be appreciated that the above description related to the invention by way of example only. Many variations on the invention will be obvious to those skilled in the art and such obvious variations are within the scope of the invention as described herein whether or not expressly described.

What is claimed as the invention is:

1. An automated grading process for grading an animal carcass having a plurality of ribs comprising the steps of:
   generating and receiving signals directed at the carcass to obtain data wherein the signals are chosen from the group of ultrasonic and laser;
   determining the location of the ribs in the carcass from the data to determine the identified ribs;
   determining a predetermined reference point on the carcass;
   determining a probing location with reference to the predetermined reference point and the identified ribs; and
   probing the carcass and obtaining a grading measurement at the probing location.

2. An automated grading process for grading an animal carcass as claimed in claim 1 wherein the predetermined reference point is a first rib of the identified ribs in the carcass.

3. An automated grading process for grading an animal carcass as claimed in claim 2 wherein the location of a third and fourth rib are identified and wherein the probing location is between the third and fourth ribs.

4. An automated grading process for grading an animal carcass as claimed in claim 3 further including the step of determining the outside edge and wherein the probing location is determined with reference to the outside edge.

5. An automated grading process for grading an animal carcass as claimed in claim 4 further including the step of determining the normal to the skin at the probe location and wherein the probe is inserted normal to the skin.

6. An automated grading process for grading an animal carcass as claimed in claim 5 wherein the probing is invasive probing.

7. An automated grading process for grading an animal carcass as claimed in claim 7 wherein the probing is ultrasonic probing.

8. An automated grading process for grading an animal carcass as claimed in claim 7 further including the step of determining the outside edge and wherein the probing location is determined with reference to the outside edge.

9. An automated grading process for grading an animal carcass as claimed in claim 8 further including the step of determining the normal to the skin at the probe location and wherein the probe is inserted normal to the skin.

10. An automated grading process for grading an animal carcass as claimed in claim 5 wherein the signal is an ultrasonic signal and wherein the normal to the skin is determined by using a method running on a computer including the steps of:
  generating and receiving ultrasonic signals with an ultrasonic sensor directed at the carcass to obtain ultrasonic skin data in relation to the position of the sensor;
  moving the ultrasonic sensor and changing the direction of the signal in relation to the carcass;
  determining the position of the sensor when it is normal to the skin.

11. A method of determining the normal to the skin as claimed in claim 10 wherein the sensor is operating in pulse echo mode.

12. A method of determining the normal to the skin as claimed in claim 11 determining the position of the sensor when the amplitude of the echo is a maximum which equals the position of the sensor when it is normal to the skin.

13. An automated grading process for grading an animal carcass as claimed in claim 1 wherein a probing location is at least a first probing location and further including determining a plurality of probing locations relative to the identified ribs and the predetermined reference point and further including probing the carcass at the plurality of probing locations and obtaining a plurality or predetermined type of measurements.

14. An automated grading process for grading an animal carcass as claimed in claim 1 wherein the grading measurement is a fat/lean measurement.

15. An automated grading process for grading an animal carcass as claimed in claim 1 wherein the probing is invasive probing.

16. An automated grading process for grading an animal carcass as claimed in claim 1 wherein the probing is ultrasonic probing.

17. An automated grading process for grading an animal carcass as claimed in claim 1 wherein the signals are ultrasonic signals and wherein the location of the ribs are determined by using a method running on a computer including the steps of:
  defining rules for identification of the ribs based on anatomical parameters of known carcass ribs including at least an ultrasonic signal profile of a rib;
  comparing the ultrasonic data with the rules; and
  determining portions of the ultrasonic data that correspond with at least one rib to determine at least one identified rib.

18. An automated grading process according to claim 17 wherein a further anatomical parameter is a width of the rib.

19. An automated grading process according to claim 18 wherein a further anatomical parameter is a distance between ribs.

20. An automated grading process according to claim 19 further including the step of first passing the ultrasonic data through a low-pass filter to remove high frequency components.

21. An automated grading process according to claim 19 further including the steps of
  defining an ultrasonic first rib rule for identification of a first rib based on an ultrasonic signal profile of a first rib of known carcass first rib;
  comparing the portions of the ultrasonic data corresponding with ribs with the ultrasonic first rib rule; and
  determining portions of the ultrasonic data that correspond with a first rib to determine the identified ultrasonic first rib.

22. An automated grading process according to claim 19 further including the steps of
  defining a width first rib rule for identification of a first rib based on a width of a first rib of known carcass first rib;
  comparing the portions of the ultrasonic data corresponding with ribs with the width first rib rule;
  determining portions of the ultrasonic data that correspond with a first rib to determine the identified width first rib;
  determining confidence levels for the identified width first rib and the identified ultrasonic first rib; and
  determining a highest confidence level and thereafter determining the identified first rib.

23. An automated grading process according to claim 22 further including the steps of
  defining a distance first rib rule for identification of a first rib based on distance to the above next adjacent identified rib of known carcass first rib;
  comparing the portions of the ultrasonic data corresponding with ribs to the above next adjacent identified rib with the distance first rib rule;
  determining portions of the ultrasonic data that correspond with a first rib to determine the identified distance first rib
  determining confidence levels for the identified distance first rib, the identified width first rib and the identified ultrasonic first rib; and
  determining a highest confidence level and thereafter determining the identified first rib.

24. An automated grading process according to claim 21 further including the steps of
  defining a distance first rib rule for identification of a first rib based on distance to the above next adjacent identified rib of known carcass first rib;
  comparing the portions of the ultrasonic data corresponding with ribs to the above next adjacent identified rib with the distance first rib rule;
  determining portions of the ultrasonic data that correspond with a first rib to determine the identified distance first rib
  determining confidence levels for the identified distance first rib and the identified ultrasonic first rib; and
  determining a highest confidence level and thereafter determining the identified first rib.

25. An automated grading process according to claim 19 further including the steps of
  defining a width first rib rule for identification of a first rib based on a width of a first rib of known carcass first rib;
  comparing the portions of the ultrasonic data corresponding with ribs with the width first rib rule; and determining portions of the ultrasonic data that correspond with a first rib to determine the identified width first rib.

26. An automated grading process according to claim 19 further including the steps of defining a distance first rib rule for identification of a first rib based on the distance to the above next adjacent identified rib of known carcass first rib;

comparing the portions of the ultrasonic data corresponding with ribs to the above next adjacent identified rib with the distance first rib rule; and determining portions of the ultrasonic data that correspond with a first rib to determine the identified distance first rib.

27. An automated grading process according to claim 17 wherein a further anatomical parameter is a distance between ribs.

28. A method running on a computer of determining the location of ribs in a scanned carcass from ultrasonic data scanned therefrom comprising the steps of:

defining rules for identification of the ribs based on anatomical parameters of known carcass ribs including at least an ultrasonic signal profile of a rib;

comparing the ultrasonic data with the rules; and determining portions of the ultrasonic data that correspond with at least one rib to determine at least one identified rib.

29. A method of determining the location of ribs according to claim 28 wherein a further anatomical parameter is a width of the rib.

30. A method of determining the location of ribs according to claim 29 wherein a further anatomical parameter is a distance between ribs.

31. A method of determining the location of ribs according to claim 30 further including the steps of defining an ultrasonic first rib rule for identification of a first rib based on an ultrasonic signal profile of a first rib of known carcass first rib;

comparing the portions of the ultrasonic data corresponding with ribs with the ultrasonic first rib rule; and determining portions of the ultrasonic data that correspond with a first rib to determine the identified ultrasonic first rib.

32. A method of determining the location of ribs according to claim 31 further including the steps of defining a width first rib rule for identification of a first rib based on a width of a first rib of known carcass first rib;

comparing the portions of the ultrasonic data corresponding with ribs with the width first rib rule;

determining portions of the ultrasonic data that correspond with a first rib to determine the identified width first rib;

determining confidence levels for the identified width first rib and the identified ultrasonic first rib; and determining a highest confidence level and thereafter determining the identified first rib.

33. A method of determining the location of ribs according to claim 32 further including the steps of defining a distance first rib rule for identification of a first rib based on distance to the above next adjacent identified rib of known carcass first rib;

comparing the portions of the ultrasonic data corresponding with ribs to the above next adjacent identified rib with the distance first rib rule;

determining portions of the ultrasonic data that correspond with a first rib to determine the identified distance first rib determining confidence levels for the identified distance first rib and the identified ultrasonic first rib; and determining a highest confidence level and thereafter determining the identified first rib.

34. A method of determining the location of ribs according to claim 32 further including the steps of defining a distance first rib rule for identification of a first rib based on distance to the above next adjacent identified rib of known carcass first rib;

comparing the portions of the ultrasonic data corresponding with ribs to the above next adjacent identified rib with the distance first rib rule;

determining portions of the ultrasonic data that correspond with a first rib to determine the identified distance first rib;

determining confidence levels for the identified distance first rib, the identified width first rib and the ultrasonic first rib; and determining a highest confidence level and thereafter determining the identified first rib.

35. A method of determining the location of ribs according to claim 30 further including the steps of defining a width first rib rule for identification of a first rib based on a width of a first rib of known carcass first rib;

comparing the portions of the ultrasonic data corresponding with ribs with the width first rib rule; and determining portions of the ultrasonic data that correspond with a first rib to determine the identified width first rib.

36. A method of determining the location of ribs according to claim 30 further including the steps of defining a distance first rib rule for identification of a first rib based on distance to the above next adjacent identified rib of known carcass first rib;

comparing the portions of the ultrasonic data corresponding with ribs to the above next adjacent identified rib with the distance first rib rule; and determining portions of the ultrasonic data that correspond with a first rib to determine the identified distance first rib.

37. A method of determining the normal to the skin of a carcass having an inside and an outside and a split edge comprising the steps of:

generating and receiving ultrasonic signals with an ultrasonic sensor directed at the carcass to obtain ultrasonic skin data in relation to the position of the sensor wherein the ultrasonic sensor is directed towards a point on the inside skin of the carcass a predetermined distance from the split edge;

moving the ultrasonic sensor and changing the direction of the signal in relation to the carcass and directing the ultrasonic sensor to the point on the inside skin of the carcass;

determining the position of the sensor when it is normal to the skin.

38. A method of determining the normal to the skin as claimed in claim 37 wherein the sensor is operating in pulse echo mode.

39. A method of determining the normal to the skin as claimed in claim 38 determining the position of the sensor when the amplitude of the echo is a maximum which equals the position of the sensor when it is normal to the skin.

40. A method of determining the location of ribs according to claim 28 wherein a further anatomical parameter is a distance between ribs.

41. A method of determining the location of ribs according to claim 28 further including the step of first passing the ultrasonic data through a low-pass filter to remove high frequency components.

42. An automated meat grading apparatus for grading an animal carcass having a plurality of ribs comprising:
- a base;
- a clamping sub-system for positioning the carcass connected to the base; and
- a sensing-probing sub-system connected to the base, the sensing-probing subsystem including:
  - a signal generator and a signal receiver each directed at the clamped carcass to obtain data wherein the signal generator is chosen from the group of ultrasonic and laser signal generators and the signal receiver is chosen from the group of ultrasonic and laser signal receivers;
  - means for determining the location of the ribs in the carcass from the ultrasonic data;
  - means for determining a predetermined reference point on the carcass;
  - means for determining a probing location relative to the identified ribs and the predetermined reference point; and
  - a probe for probing the carcass and obtaining a predetermined type of measurement at the probing location.

43. An automated meat grading apparatus as claimed in claim 42 wherein the signal generator is an ultrasonic signal generator and the receiver is an ultrasonic signal receiver.

44. An automated meat grading apparatus as claimed in claim 42 wherein the signal generator is a laser signal generator and the receiver is a laser signal receiver.

45. An automated meat grading apparatus as claimed in claim 42 wherein the components are modular.

46. An automated meat grading apparatus as claimed in claim 45 wherein the sensing-probing subsystem is movable vertically and horizontally relative to the clamping sub-system.

47. An automated meat grading apparatus as claimed in claim 45 wherein the sensing-probing subsystem includes a robotic arm and wherein the probe is attached thereto.

* * * * *